United States Patent
Lin et al.

(10) Patent No.: US 9,602,849 B2
(45) Date of Patent: Mar. 21, 2017

(54) METHOD AND APPARATUS FOR SCRUB PREVIEW SERVICES

(75) Inventors: Kui Lin, Redwood City, CA (US); Hong Heather Yu, West Windsor, NJ (US); Hongbing Li, Belle Mead, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 1141 days.

(21) Appl. No.: 13/233,928

(22) Filed: Sep. 15, 2011

(65) Prior Publication Data

US 2012/0070129 A1    Mar. 22, 2012

Related U.S. Application Data

(60) Provisional application No. 61/384,166, filed on Sep. 17, 2010, provisional application No. 61/428,776, filed on Dec. 30, 2010.

(51) Int. Cl.

| | |
|---|---|
| G06F 17/00 | (2006.01) |
| H04N 21/2343 | (2011.01) |
| G06F 17/21 | (2006.01) |
| G06F 17/30 | (2006.01) |
| H04N 21/472 | (2011.01) |
| H04N 21/8549 | (2011.01) |

(52) U.S. Cl.
CPC ... *H04N 21/234327* (2013.01); *G06F 17/211* (2013.01); *G06F 17/212* (2013.01); *G06F 17/30896* (2013.01); *H04N 21/47202* (2013.01); *H04N 21/8549* (2013.01)

(58) Field of Classification Search
CPC ............... G06F 15/16; H04N 21/6587
USPC ................... 709/206; 715/719, 273
See application file for complete search history.

(56) References Cited

U.S. PATENT DOCUMENTS

| | | | |
|---|---|---|---|
| 5,635,982 | A | 6/1997 | Zhang et al. |
| 5,826,102 | A | 10/1998 | Escobar et al. |
| 6,204,840 | B1 | 3/2001 | Petelycky et al. |
| 6,252,975 | B1 | 6/2001 | Bozdagi et al. |
| 6,340,971 | B1 | 1/2002 | Janse et al. |

(Continued)

FOREIGN PATENT DOCUMENTS

| | | |
|---|---|---|
| CN | 102232319 A | 11/2011 |
| CN | 102439866 A | 5/2012 |

(Continued)

OTHER PUBLICATIONS

Guillemot, M., et al., "A Hierarchical Keyframe User Interface for Browsing Video over the Internet," Proceedings of the ninth IFIP TC13 international conference on Human-Computer Interaction, Sep. 2003, 4 pages, Zurich, Switzerland.

(Continued)

*Primary Examiner* — Jeffrey A Gaffin
*Assistant Examiner* — Ayesha Huertas Torres
(74) *Attorney, Agent, or Firm* — Slater Matsil, LLP

(57) ABSTRACT

In accordance with an embodiment of the present invention, a method of streaming a media preview includes delivering a preview data having preview information from a media file to be streamed. The preview data has a multi-dimensional hierarchical data structure has a plurality of layers with increasing content of the preview information in each layer of the plurality of layers. The preview data is configured to provide an adaptive and scalable preview service.

38 Claims, 13 Drawing Sheets

(56) References Cited

U.S. PATENT DOCUMENTS

| | | |
|---|---|---|
| 6,393,054 B1 | 5/2002 | Altunbasak et al. |
| 6,453,471 B1 | 9/2002 | Klosterman |
| 6,711,587 B1 | 3/2004 | Dufaux |
| 6,718,117 B1 | 4/2004 | Rijckaert et al. |
| 6,782,049 B1 | 8/2004 | Dufaux et al. |
| 7,281,199 B1 | 10/2007 | Nicol et al. |
| 7,418,192 B2 | 8/2008 | Gutta et al. |
| 7,471,834 B2 * | 12/2008 | Sull et al. ............ 382/232 |
| 7,558,760 B2 | 7/2009 | Fang et al. |
| 7,873,211 B1 * | 1/2011 | Grundmann et al. ...... 382/162 |
| 8,745,481 B1 | 6/2014 | Ulm |
| 8,832,740 B2 * | 9/2014 | Kim et al. ............ 725/40 |
| 2003/0110184 A1 | 6/2003 | Gibson, Jr. et al. |
| 2004/0187159 A1 | 9/2004 | Gaydos, Jr. et al. |
| 2006/0159006 A1 | 7/2006 | Yeon et al. |
| 2006/0224940 A1 * | 10/2006 | Lee ............ 715/500.1 |
| 2006/0282776 A1 | 12/2006 | Farmer et al. |
| 2007/0074244 A1 | 3/2007 | Miyamori |
| 2009/0083631 A1 | 3/2009 | Sidi et al. |
| 2009/0219977 A1 | 9/2009 | Iwamatsu |
| 2010/0093288 A1 | 4/2010 | Pan et al. |
| 2010/0257569 A1 | 10/2010 | O'Hanlon |
| 2011/0170625 A1 | 7/2011 | Blankenship et al. |
| 2011/0176499 A1 | 7/2011 | Siomina et al. |
| 2013/0182791 A1 | 7/2013 | Dhakal et al. |
| 2014/0033025 A1 | 1/2014 | Mukherjee et al. |

FOREIGN PATENT DOCUMENTS

| | | |
|---|---|---|
| CN | 103067095 A | 4/2013 |
| CN | 103262453 A | 8/2013 |

OTHER PUBLICATIONS

Komlodi, A., et al., "Key frame preview techniques for video browsing," Proceedings of International Conference on Digital Libraries, 1998, pp. 118-125, Pittsburgh, PA.

* cited by examiner

80 OVERLAY PREVIEW WINDOW

CONVOY PREVIEW WINDOW 90

RICH MEDIA DESCRIPTION AND OTHER RELATED INFORMATION

METHOD AND APPARATUS FOR SCRUB PREVIEW SERVICES

This application claims the benefit of U.S. Provisional Application No. 61/384,166, filed on Sep. 17, 2010, entitled "Method and Apparatus for Differentiated Scrub Preview Services," and U.S. Provisional Application No. 61/428,776, filed on Dec. 30, 2010, entitled "Method and Apparatus for Processing Scrub Description," which applications are hereby incorporated herein by reference.

CROSS-REFERENCE TO RELATED APPLICATIONS

This application relates to the following co-pending and commonly assigned patent application Ser. No. 13/233,882, filed Sep. 15, 2011, which application is hereby incorporated herein by reference.

TECHNICAL FIELD

The present invention relates generally to media processing, and more particularly to a system and method for scrub preview services.

BACKGROUND

In recent years, media consumption has dramatically increased. This has resulted in a rapid increase in available media content. Consequently, consumers of the media have to select from a large array of available media content. However, there is no easy mechanism for making this selection.

Consumers of textual data have a much better experience than media consumers due to the availability of summaries, snippets, keywords, etc. For example, short summaries of large textual content provide users with an abstract of the content. This allows the user to rapidly select the articles/web pages to read.

In contrast, media consumers have to sort through the actual footage of the media before selecting a suitable media (or a portion of the media) to watch. For example, in a typical media player, a consumer must use the forward button to play the media stream at a faster frame rate, which mutes the audio channel. Further, the user may want to watch only a certain portion of the media stream, e.g., the financial summary in a news feed so that he can judge whether the financial news is worth watching. However, the user is likely to be frustrated because of the difficulty in identifying the appropriate relevant portion of the media stream and the necessity to watch the media stream to get the needed summary. Such ineffective means introduce inefficiencies in media selection and result in a degraded user experience.

SUMMARY OF THE INVENTION

These and other problems are generally solved or circumvented, and technical advantages are generally achieved, by illustrative embodiments of the present invention.

In accordance with an embodiment of the present invention, a method of generating a media preview of a media stream comprises generating a preview data by extracting preview information from a media file to be streamed. The preview data comprises a multi-dimensional hierarchical data structure having a plurality of layers with increasing content of the preview information in each layer of the plurality of layers. The preview data is configured to provide an adaptive and scalable preview service.

In accordance with another embodiment of the present invention, a method of streaming media comprising a media preview comprises delivering a preview data comprising preview information from a media file to be streamed. The preview data comprises a multi-dimensional hierarchical data structure having a plurality of layers with increasing content of the preview information in each layer of the plurality of layers. The preview data is configured to provide an adaptive and scalable preview service.

In accordance with another embodiment of the present invention, a method of receiving a media preview of a media stream comprises sending a preview data request to a preview server. The preview data request comprises a request for preview data. The method further comprises receiving a preview data comprising preview information from a media file to be streamed. The preview data comprises a multi-dimensional hierarchical data structure having a plurality of layers with increasing content of the preview information in each layer of the plurality of layers.

In accordance with another embodiment of the present invention, an apparatus for generating a media preview of a media stream comprises a preview data generator. The preview data generator under various embodiments is configured to generate a preview data by extracting preview information from a media file to be streamed. The preview data comprises a multi-dimensional hierarchical data structure having a plurality of layers with increasing content of the preview information in each layer of the plurality of layers. The preview data generator is configured to provide preview data for an adaptive and scalable preview service.

In accordance with another embodiment of the present invention, an apparatus for streaming a media preview of a media comprises a preview data sender configured to deliver a preview data. The preview data comprises preview information for a media file being streamed. The preview data comprises a multi-dimensional hierarchical data structure having a plurality of layers with increasing content of the preview information in each layer of the plurality of layers. The preview data sender is configured to provide an adaptive and scalable preview service.

In accordance with another embodiment of the present invention, an apparatus for receiving media having a media preview comprises a preview data sender configured to send a preview data request to a preview server. The preview data request comprises a request for a preview data for a media file being received. The preview data receiver is configured to receive the preview data comprising preview information for the media file. The preview data comprises a multi-dimensional hierarchical data structure having a plurality of layers with increasing content of the preview information in each layer of the plurality of layers.

Advantageously, embodiments of the invention allow full video preview and ultra-fast preview start up capability even under narrow bandwidth conditions.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 13, which includes FIGS. 13A and 13B, illustrates one sample embodiment using aligned scrub description scheme, wherein FIG. 13A illustrates a scrub description data structure and FIG. 13B shows an example;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
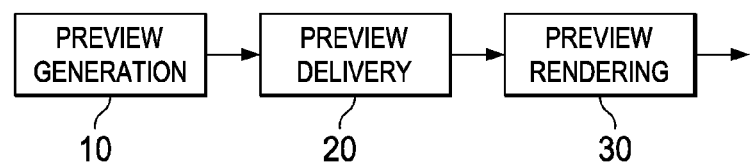
FIG. 1 describes a preview system for generating, delivering, and rendering the preview system in various embodiments of the invention.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the typical online media platforms or delivery systems today, on-demand media content (especially video) is presented via powerful media players which allow the users to randomly seek to any spot to continue the video playback. The media content is consumed either linearly (by default, for example, by clicking a web thumbnail which leads to a media playing in a media player) or randomly by the end user by dragging the play-head of the media player forward or backward to a random spot. These types of media consumption models do not provide the end users effective consumption of media content. The random drag (scrub) of play-head may appear to provide infinite flexibility to the end users, but in fact the dragging to a spot involves random guess work and users often have to watch the content for a little bit to decide if this is worth continuing or another random drag is in order.

Preview is a natural tool for people to sample the content of a video before watching it. Online video streaming traffic accounts for the lion's share of the internet traffic today and continues to grow. Customers are demanding for more content, more flexibility, more service capability, more personalization, and better qualities. Providing large amount of preview data can take up considerable network delivery resources. To control the consumption of delivery resources, e.g., the delivery network bandwidth consumption, the preview delivery service are limited to the network condition, resource availability, as well as service capabilities. However, such brute force restriction of preview content degrades experience for all customers.

As described further below, an adaptive scrub preview scheme can overcome these limitations. The problem of lacking reference information during the active consumption of online media (i.e., drag of play-head in a player to seek for a more desirable spot to continue) may be overcome with a scrub preview scheme. End users are provided a series of preview data such as preview images (or even lower resolution video clips) as the end users drag the play-head along the progress bar. Thus, the system greatly enhances active media consumption of the end users by allowing them to seek a preferred spot to continue the media consumption, and hence greatly improves the end user media consumption experience.

Embodiments of the invention describe an adaptive service to offer customers fair and superior service capability with the service provider being able to gain increased average revenue per user (ARPU). Embodiments of the present invention discloses a fair and differentiated preview service scheme including a differentiated scrub preview service scheme based on a multi-layer data structure, multi-stage delivery scheme, and offers multi-style presentation format. The proposed scheme as described in various embodiments can further improve user experiences, service personalization capability, as well as other preview service capabilities.

The adaptive scrub preview scheme as described in various embodiments is scalable, flexible and extensible. Some embodiments of the present invention provide an ultra-fast preview startup and switching functionality. Consequently, the scrub preview is capable of supporting preview functions in mobile network or other networks with limited bandwidth or networks with frequent bandwidth fluctuations. Some embodiments of the present invention provide dual view and toggle view scrub previews which offer richer service capability. Embodiments of the invention also offer additional preview styles for better personalized preview services.

A number of new features and advantages are provided by embodiments of the present invention. For example, one aspect relates to a system to support adaptive and scalable preview services with preview generation, preview delivery, and preview rending. Another aspect relates to an adaptive preview service scheme based on a multi-layer data structure, multi-stage delivery scheme, and provides multi-style presentation format. Yet another aspect relates to a differentiated scrub preview service scheme with flexible and personalization enabled service capability. Yet a further aspect relates to an adaptive and scalable preview service system that supports single or multiple service provider based preview for IP video delivery services.

Embodiments of the present invention provide advantages and distinctions over alternative technologies. In traditional preview system, the preview functions are usually simple, easy to use, but non-scalable, without personalization capability, with limited ability to adapt to the changing network and other environment conditions, and with little presentation flexibility and adaptation capability. In various embodiments, the present invention offers a wide range of scalable and adaptive preview service capabilities. The scalability and flexibility make it possible for an IP video delivery service provider to support differentiated preview services for added ARPU. A differentiated preview service scheme with a multi-layer data structure, multi-stage delivery scheme, and multi-style presentation format is also disclosed.

Scrub preview provides an incorporated service that is part of the IP video delivery service. Embodiments of the present invention offer means to support an independent differentiated preview service via a preview service system that offers both single and multiple service provider based preview service capability for IP video delivery services. Versions of scrub video are flexible, scalable and extensible preview scheme but might not support differentiated service scheme. Embodiments of the invention support a wide range of differentiated preview services.

A generic embodiment of the preview system for generating, delivering, and rendering the preview system will be described using FIG. 1, 22-24. A first set of embodiments of the present invention will be described for providing a scrub preview service based on preview data type using FIGS. 8-10. A second set of embodiments of the present invention will be described for providing a scrub description based preview service using FIGS. 11-21.

FIG. 1 describes a preview system for generating, delivering, and rendering the preview system in various embodiments of the invention.

Referring to FIG. 1, a typical preview system in accordance with embodiments of the invention includes three main components, namely Preview Generation (PG 10), Preview Delivery (PD 20), and Preview Rendering (PR 30). PG 10 takes a media stream and generates preview data. PD 20 delivers the preview data to the client (media player). The media player receiving the preview data renders the preview to the display (PR 30).

In various embodiments, the preview may be rendered using different type of client interface configurations. FIG. 2 to FIG. 7 illustrate six sample preview client interface configurations. Notice that these are merely examples. The present invention does not limit the type of preview interface configurations. One skilled in the art can easily implement the current invention in different interface configurations.

Figure 2:
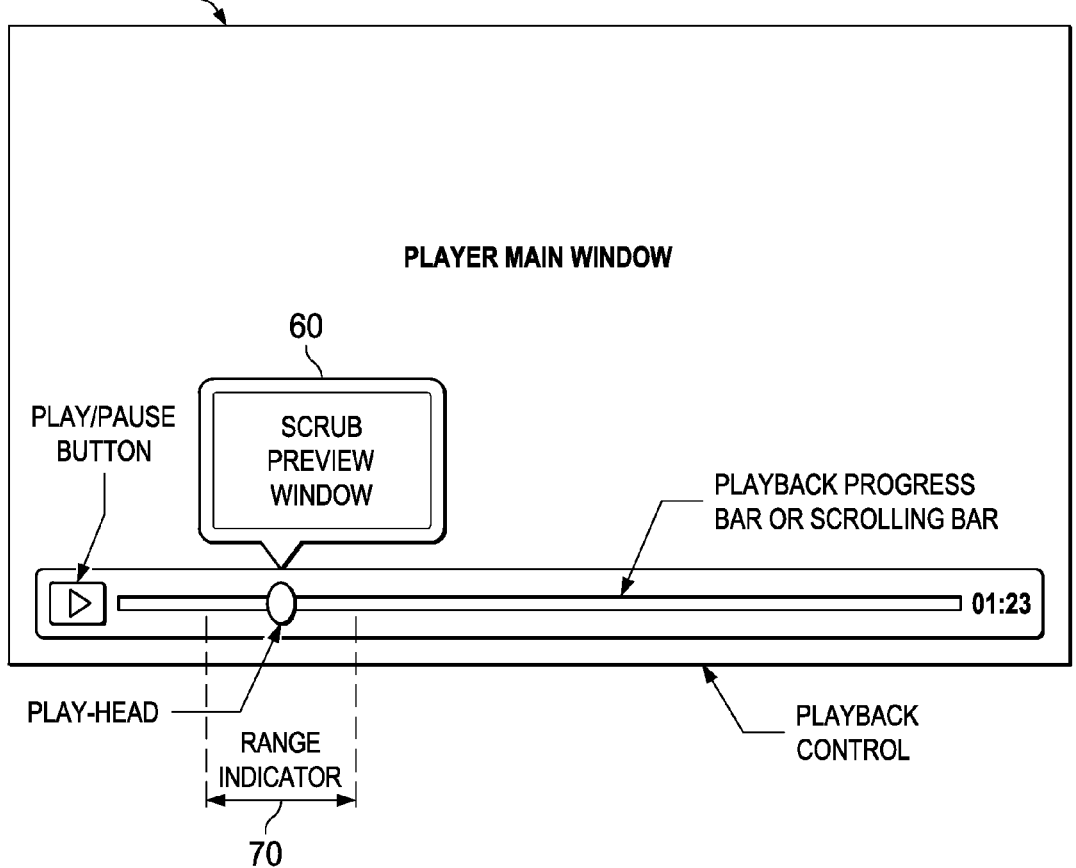
FIG. 2 schematically indicates the typical media player components and their relative positions in a media player.

FIG. 2 schematically indicates the typical media player components and their relative positions in a media player. FIG. 2 illustrates a schematic of a media player 50 illustrating a preview using a scrub preview window 60 and a range indicator 70 indicating the validity of the preview.

FIG. 2 shows a reduced size scrub preview window 60 which can also be used for the description based scrub preview as will be described further below (FIGS. 11-21). The size of the scrub preview window 60 may vary from small to full player window size depending on application needs. When a media player user initiates a scrub preview, the user drags the play-head forward or backward along the preview bar.

The preview bar may be the playback progress bar, or it may be a separate bar. The granularity of the preview is, in general, proportion to the length of the video. To offer personalized experience, however, a scalable preview rendering function may be realized using one or more embodiments of the present invention. Furthermore, a localized scalable preview rendering capability can be achieved where the scalability of the preview is proportional to the play-head dragging speed with locality sensitivity. Users can easily browse through a video from the beginning to the end or back and forth. A user can also start the playback instantly at any preview position and start to watch the video thereafter. The preview description data stream delivery scheme optimizes the video preview start up time and ensures the preview playback has no glitch.

Figure 3:
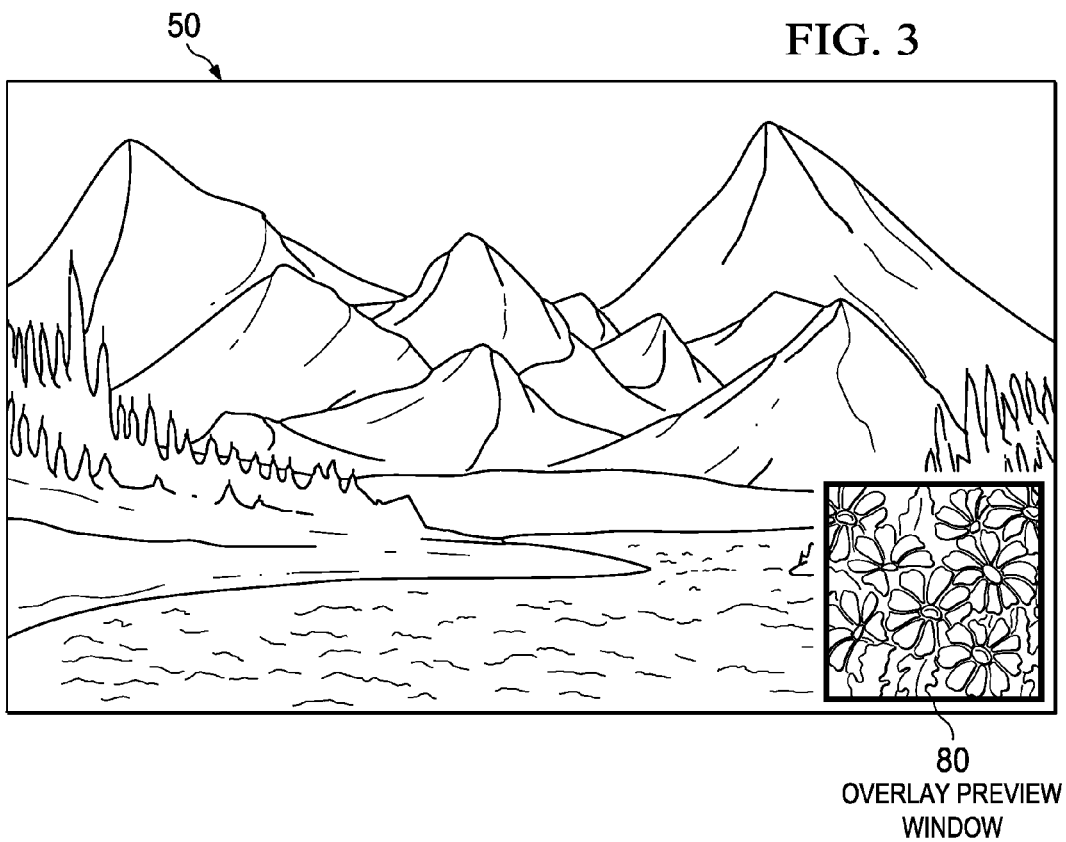
FIG. 3 illustrates a schematic of a media player illustrating a preview using an overlay preview window.
Figure 4:
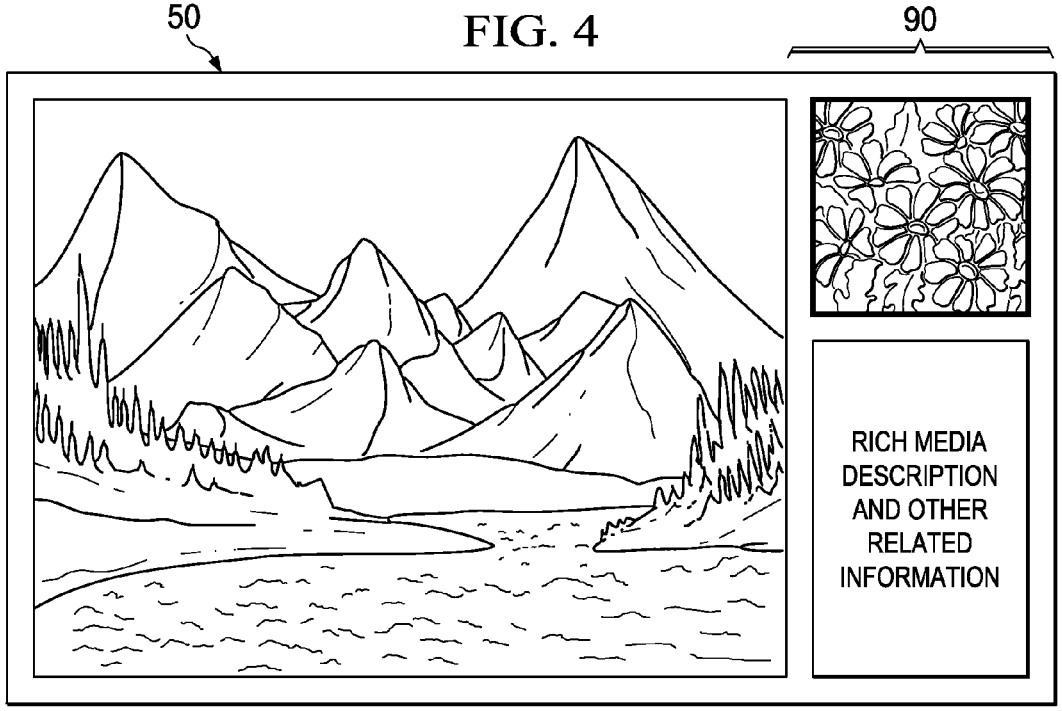
FIG. 4 illustrates a schematic of a media player illustrating a preview using a convoy preview window.
Figure 5:
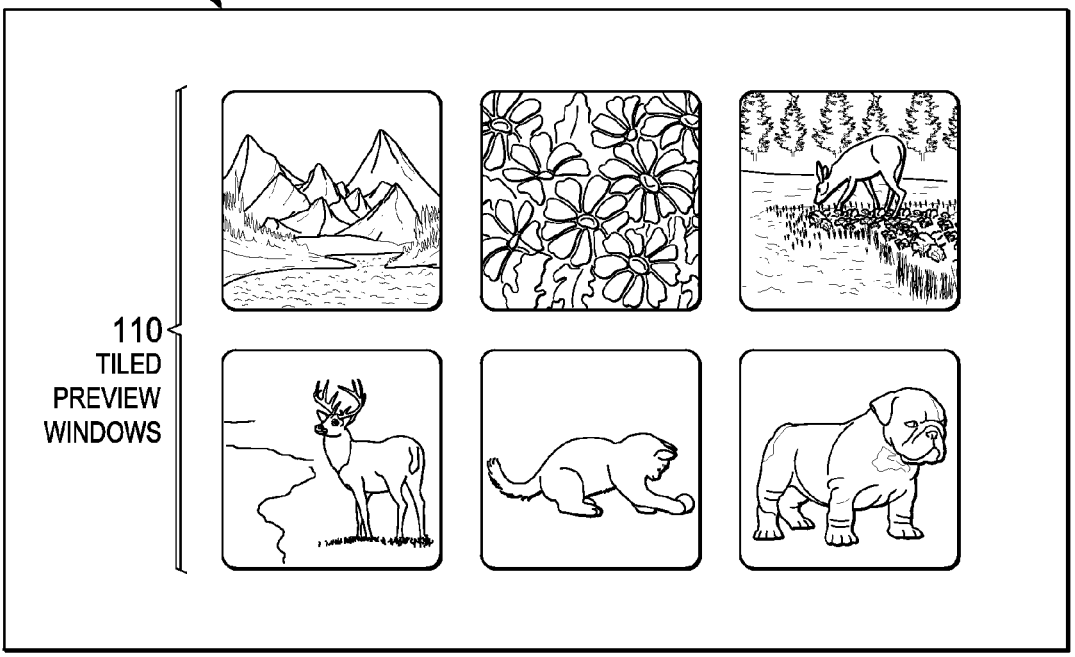
FIG. 5 illustrates a schematic of a media player illustrating a preview using tile preview windows.
Figure 6:
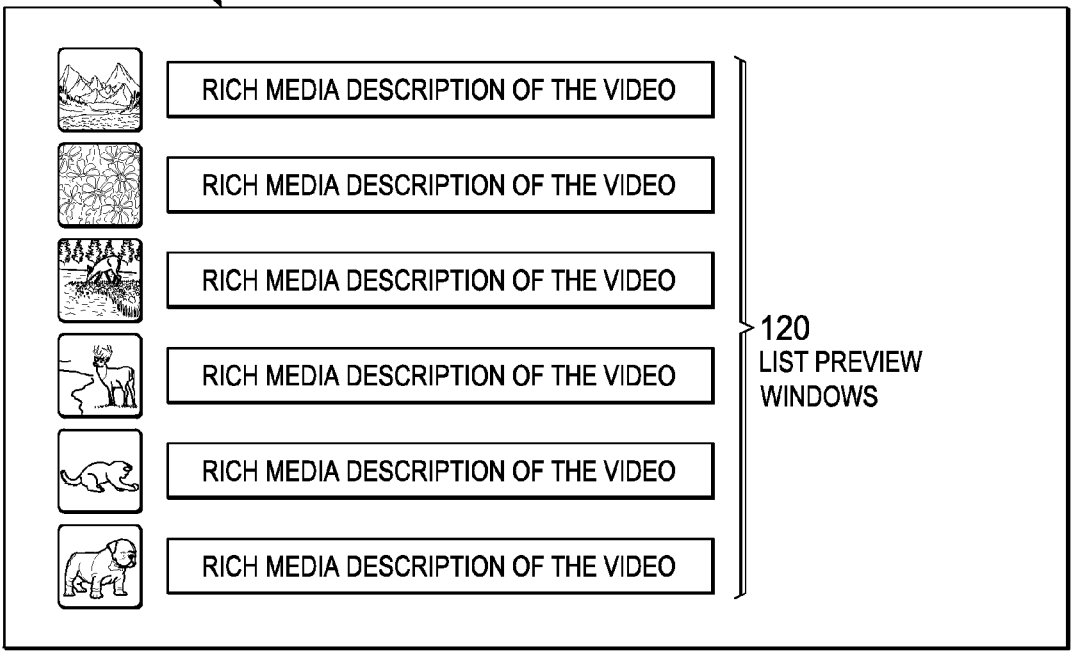
FIG. 6 illustrates a schematic of a media player illustrating a preview with list preview.
Figure 7:
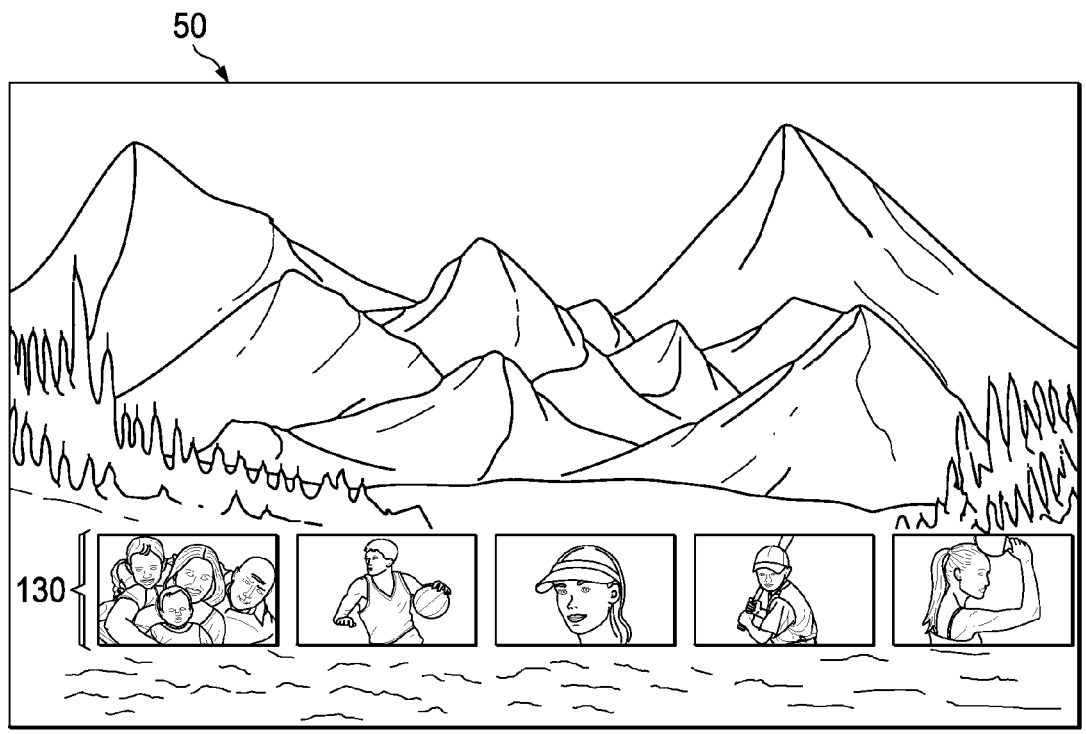
FIG. 7 illustrates a schematic of a media player illustrating a preview using thumbnails preview.

FIG. 3 illustrates a schematic of a media player 50 illustrating a preview using an overlay preview window 80. FIG. 4 illustrates a schematic of a media player 50 illustrating a preview using a convoy preview window 90. FIG. 5 illustrates a schematic of a media player 50 illustrating a preview using tile preview windows 110. FIG. 6 illustrates a schematic of a media player 50 illustrating a preview with list preview 120. FIG. 7 illustrates a schematic of a media player 50 illustrating a preview using thumbnails preview 130.

In various embodiments, the preview delivery service may be adapted based on some discrimination functions or service configurations to control the delivery resources consumption, e.g., the delivery network bandwidth consumption. In various embodiments, a service provider, may provide several classes of services, SC(1), SC(2), . . . SC(X). Different classes of services may be set apart by the service capability, the subscription fees, and other suitable parameters as may be identified by one skilled in the art. Customers subscribing to a higher class subscription, e.g., SC(X), may get better Quality of Service (QoS) and/or Quality of Experience (QoE) guarantees whereas customers subscribing to a lower class subscription, e.g., SC(1), may get significantly less service capability support compared with that of the higher class subscription customer.

For instance, a SC(X) subscriber may get the best type of preview configuration, the highest amount of description data, the most flexibility to preview a video, and the highest quality with the highest resolution of the preview video. In contrast, a SC(1) subscriber may experience some service capability loss and may only get the minimum amount of data delivered to its player with a minimum support on the preview configurations and a minimum flexibility on how the video can be previewed. Hence, while the SC(X) subscriber may enjoy a full range of preview service capabilities and personalize the service based on its own preference, the SC(1) subscriber may only enjoy a limited preview service capability with limited personalization.

Because of such differentiation between different customers, a service provider can balance the resource distribution when the network resource or other related types of resources are limited. Accordingly, this type of differentiated preview service can provide fair services to its subscriber i.e. higher paying customers receive better service than lower paying customers.

Figure 8:
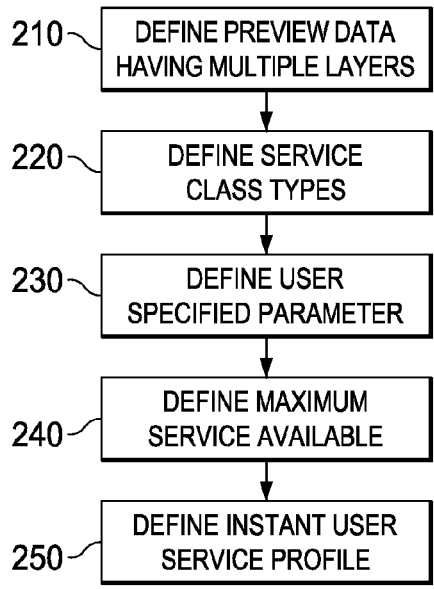
FIG. 8 illustrates operations in accordance with an embodiment of the invention for preview generation.
Figure 9:
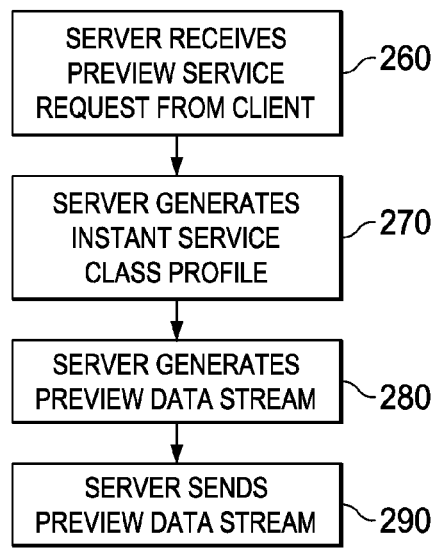
FIG. 9 illustrates operations in accordance with an embodiment of the invention for preview delivery.

Further details on implementing an embodiment of the invention is described using FIGS. 8 and 9.

FIG. 8 illustrates operations in accordance with an embodiment of the invention for preview generation.

Different types of preview data D(i), i=[1,I], are first defined (step 210). For instance, let a first type of preview data D(1) may be a preview video data, a second type of preview data D(2) may be a preview audio data, a third type of preview data D(3) may be keyframe images, a fourth type of preview data D(4) may be preview content description text, a fifth type of preview data D(5) may be preview content description image, a sixth type of preview data D(6) may be a preview of relevant images, a seventh type of preview data D(7) may be preview relevant text, etc.

The preview data may comprise a hierarchical structure. In other words, multiple layers of preview data may be used, each layer having more information than an underlying layer. For example, a higher layer may provide a higher resolution preview, a longer length preview, and/or video parameters e.g. color versus grayscale, bitrate etc. In a hierarchical preview data having J layers, the $j^{th}$ layer of the type D(i) data can be denoted as P(j)|D(i), j=[1,J]. For instance, if D(1) represents preview video data, P(1)|D(1) could be the first layer of the preview video data with a resolution 120×90 in gray scale, P(2)|D(2) could be the second layer of the preview video data with a resolution 240×180 in gray scale, and so on.

Next, the service class is defined (step 220). Let service class SC(x), x=[1,X], be the preview service types offered by a service provider with service class SC(X) being the highest level of service class or VIP service class. The VIP service class provides consumers the ultimate service capability and flexibility and let service class SC(1) be the lowest level of service class, e.g., cheapest service which offers a minimum preview service capability.

In addition, user specified parameters may also be defined (step 230). For example, β(k)|D(i) defines the user specified parameter for preview data type D(i) to be delivered to the client. For instance, β(1)|D(1) may represent a low resolution gray scale video, β(2)|D(1) may represent a low resolution color video, β(3)|D(1) may represent a medium resolution video, β(4)|D(1) may represent a high resolution video, β(1)|D(4) may represent a minimum text description, β(2)|D(4) may represent a moderate text description, and β(3)|D(4) may represent a maximum text description, etc.

For each type of service, a maximum allowed service class profile is defined (step 240). For example, a service class profile $SCP_{max}(x)=[P(j^{1*})|D(1), P(j^{2*})|D(2), \ldots, P(j^{I*})|D(I)]$ where $P(j^{i*})|D(i)$ denotes the maximum layers of data for D(i) type of preview data. Thus, maximum allowed service class profile $SCP_{max}(x)$ is the highest possible preview that is available.

As illustrated in step 250, an instance service class profile for each user L is defined as $SCP_{ins}(x)=[P(j^{1'})|D(1), P(j^{2'})|D(2), \ldots, P(j^{I'})|D(I)]$ where $P(j^{i'})|D(i)$ denotes the specified layers of data for D(i) type of preview data with $j^{i'} \le j^{i*}$. That is, the service provider may specify a set of rules for the preview data delivery that corresponds to each parameter to identify the layer associated for each preview data type D(i). In various embodiments, a default setting maybe used based on user preferences and profiles as well as the service class level she subscribes to.

In one or more embodiments, the client may also interactively adjust the preview service using some simple click based interfaces at the client side if her subscription level includes such service support. That is, the default instance service class profile $SCP_{ins}(x)|L$ default may or may not equals to instant service class profile $SCP_{ins}(x)|L$ instant. But, in various embodiments, $SCP_{ins}(x)|L$ default or $SCP_{ins}(x)|L$ instant cannot exceed beyond the maximum allowed service class profile $SCP_{max}(x)$. The selected type (parameter) of preview service capability shall be translated into an adjustment or adaptation of a new or different set of preview data being delivered to the client by the server.

An embodiment of the invention for preview delivery will be described using FIG. 9.

A server receives a preview service request from a client (step 260). Once a server receives a preview service request indicating a default or instant service class profile with Q(x)|Ldefault or Q(x)|Linstant. The server translates the request into the corresponding service class profile, e.g., $SCP_{ins}(x)|L$ default or $SCP_{ins}(x)|L$ instant (step 270). Next, the server parses the requested profile by extracting the appropriate layer of the preview data, e.g., $P(j^{1'})|D(1)$=120× 90 color video (step 280). The extracted preview data is packaged and scheduled into a preview data stream. The preview data stream is delivered to the client side from which the preview request arose (step 290). All these steps may be performed in a single edge server or alternatively over a combination of network nodes, depending on the content delivery system capability and configurations. Once the client receives the preview data package, it decodes the package. The preview data may be rendered based on a default player setting or a user specification, and enables the user to enjoy the preview content instantly. Synchronization to the original media stream may be needed so that the preview data represents a particular location on the original media stream.

A differentiated preview service can be implemented for any kind of preview service. In the following, a sample embodiment for differentiated scrub preview service scheme is discussed. Several types of scrub previews including keyframe based scrub preview, description based scrub preview, and dual view scrub preview may be used in various embodiments of the invention. With differentiated scrub preview service, a highest class subscriber SC(X) may get the dual-view scrub preview support with both the scrub description data and the keyframe data delivered to its player. However, a lowest class subscriber SC(1) may experience some service capability loss and may only get one or two lower layers of the scrub description data delivered to its player. Hence, while the highest class subscriber SC(X) may enjoy a full scrub preview service and personalize the service based on its own preference, the lowest class subscriber SC(1) may only enjoy a coarse level scrub preview presented in a single text based style. When the network resource or other related types of resources are limited or constraint, this type of differentiated scrub preview service can help a service provider to balance the resource distribution and provide fair services to its subscriber.

In yet another embodiment of the present invention, an independent preview service can be offered. Any user can subscribe to the preview service with or without the subscription to the VoD or real time video delivery service. A user subscribed to the preview service can be connected directly to the preview server at her request. The server shall deliver the preview content to the user based on her subscriber service class, the user profile, the network and device condition, etc. In this embodiment, the preview service server maybe connected to multiple video delivery servers that are part of a single or multiple IP video delivery service providers.

Figure 10:
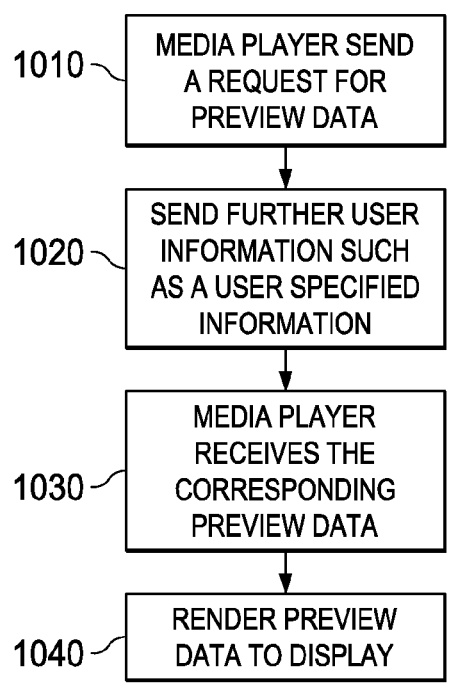
FIG. 10 illustrates operations in accordance with an embodiment of the invention for preview rendering.

FIG. 10 illustrates operations in accordance with an embodiment of the invention for preview rendering.

Referring to FIG. 10, a client, e.g., media player send a request for preview data (Step 1010). The media player may also send further user information such as a user specified information β (described above) for preview data requested (Step 1020). For instance, the media player may request that the first layer data may be transmitted as a low resolution gray scale video. The media player receives the corresponding preview data (Step 1030). Next, the media player renders the preview data to a display (Step 1040).

Another embodiment of the present invention using description based preview will next be described using FIGS. 11-21.

Embodiments of the present invention extend the scrub preview scheme to provide ultra-fast preview startup functionality. Instead of keyframe based scrub preview, in this embodiment of the present invention, description based scrub previews are used. The preview can start instantly without affecting the playback of the video, even in very low bandwidth network conditions. In a separate embodiment, the present invention describes the systems and scheme to achieve an additional scrub preview style called dual view scrub preview that takes advantage of both the description based and the keyframe based scrub preview. The dual view scrub preview offers additional personalized service capability. Embodiments of the present invention address the system and method to realize the description based scrub preview as well as the dual view scrub previews in a networked media distribution system with an online media player.

Figure 11:
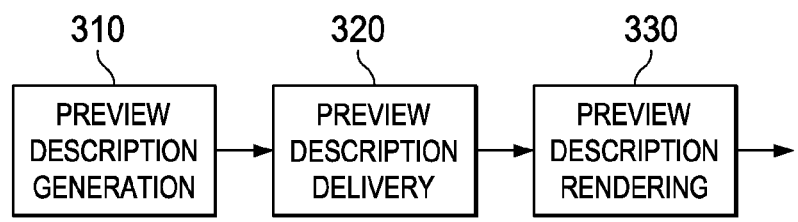
FIG. 11 illustrates a scrub description preview system in accordance with embodiments of the invention.

FIG. 11 illustrates a scrub description preview system in accordance with embodiments of the invention.

Referring to FIG. 11, the preview description system in accordance with embodiments of the invention includes three main components, namely Preview Description Generation (PDG 310), Preview Description Delivery (PDD 320), and Preview Description Rendering (PDR 330). This is similar to the scrub preview system discussed in above using FIG. 1.

PDG 310 is a process to extract and prepare necessary preview description, i.e., the scrub description data, for effective delivery and rendering. PDG 310 may happen either during an Ingest Process or after the Ingest Process. If the Content Delivery Process is a multi-step process, the PDG 310 may happen in any step. In various embodiments, the PDG 310 may generate additional content description metadata beyond the existing metadata in order to support the Fast Media Preview feature.

PDD 320 is a process whereby necessary Preview Description data and other metadata are delivered to the end user media player for preview rendering. The detailed algorithm of when and how to deliver which preview description data file(s) will be described further below using FIGS. 15 and 16.

PDR 330 is a process by which delivered preview description data, i.e., the scrub description data files are rendered to the end user as play-head is being dragged to seek a desired position. The PDR 330 process is sufficiently general so that it can be implemented easily by any player with a simple PlugIn module in various embodiments.

The description based scrub preview may be implemented in a stand-alone preview system. Alternatively, it may be an add-on layer to the original keyframe based scrub preview system. In addition, in one or more embodiments, it can be employed in combination with the keyframe based scrub preview to achieve dual-view scrub preview or toggled scrub preview. For ease of presentation, we shall use scrub description in the following discussion. A scrub description is a set of text that can be used to describe the content of the media or the information associated with the content of the media at a particular time frame, maybe displayed in a static or dynamic manner, and can facilitate media preview.

Embodiments of the PDG, PDD, and PDR implemented a description based scrub preview in a stand-alone preview system will be described.

Figure 12:
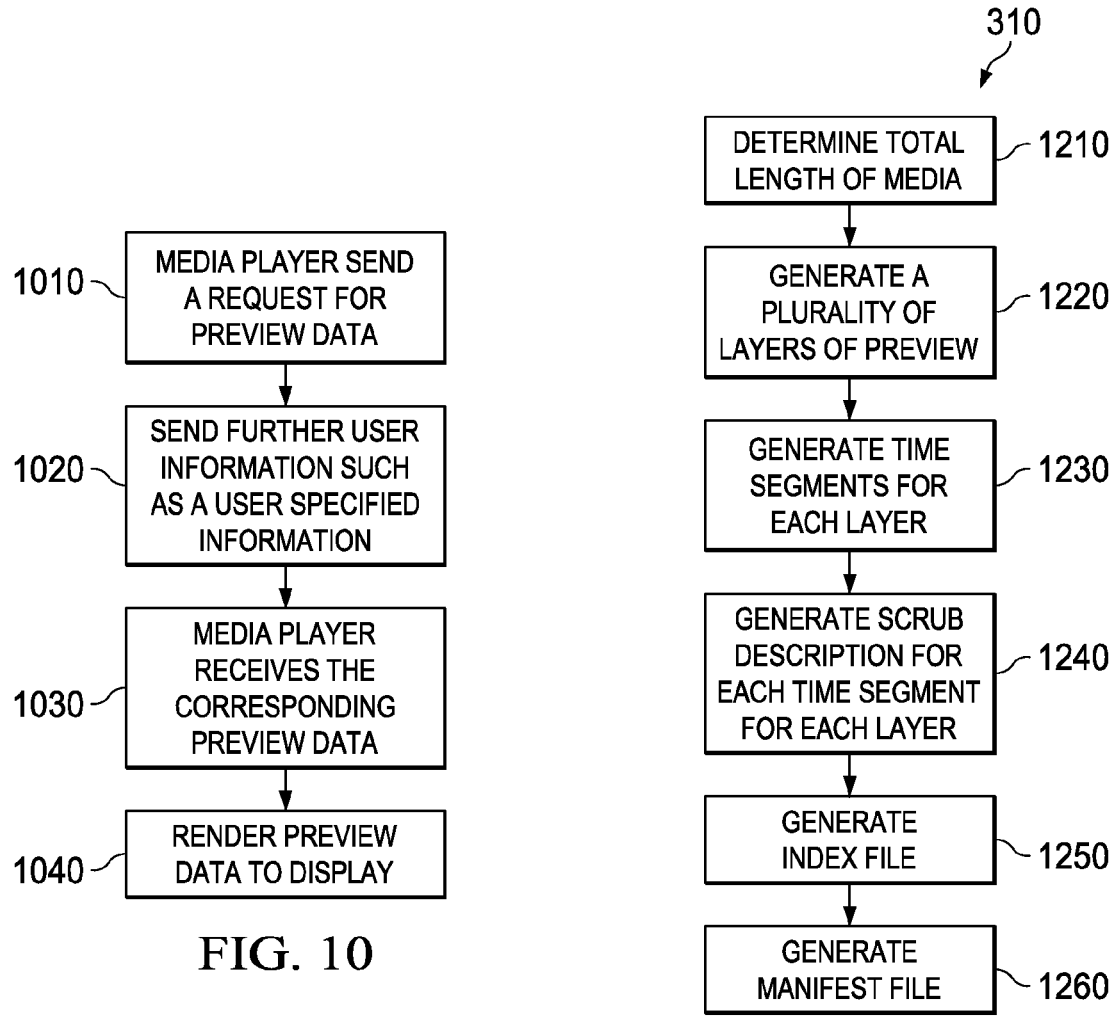
FIG. 12 illustrates operations of generating description based scrub preview in a stand-alone preview system.

FIG. 12 illustrates operations of generating description based scrub preview in a stand-alone preview system (PDG 310 of FIG. 11).

PDG 310 includes scrub description data extraction, scrub description management data generation, i.e., manifest file and index file creation, and scrub description data stream creation components. In accordance with embodiments of the invention, the preview data should satisfy several requirements to facilitate a fast scrub preview function.

First, the scrub description data should be small in size. To provide full video preview and ultra-fast preview start up capability especially in narrow bandwidth conditions, the preview media data stream, i.e., the scrub description data, is very small in size. Consequently, delivery of the preview media data stream will not hinder the delivery of the original media data stream or affect the playback experience of the original media data stream. To achieve that, the scrub description data is designed to be compact.

Second, for a quality preview experience, the preview content should capture the essence of the original media data stream. That is the scrub description should tender accurate content information about the particular segment of the video content in preview.

Third, to offer fast playback switching from any preview point to the corresponding original media stream point and vice versa, it is desired that the scrub description data streaming is well synchronized with the original media stream.

Figure 13A:
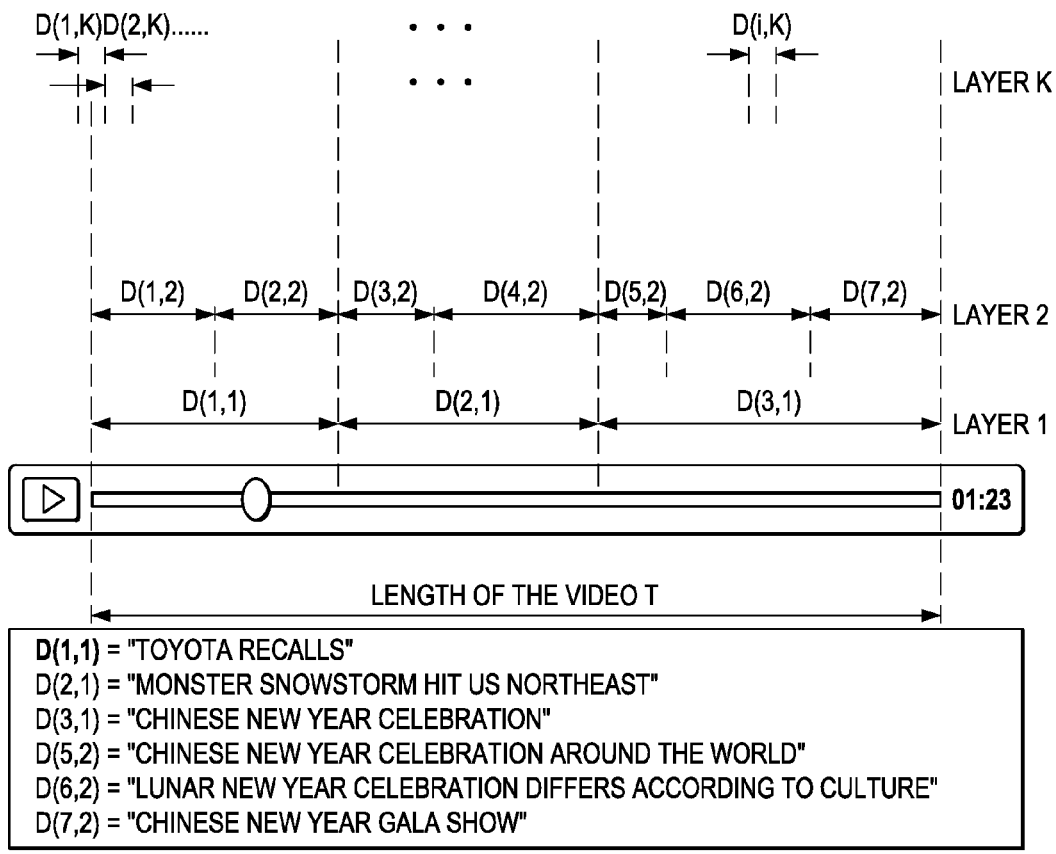
Figure 13B:
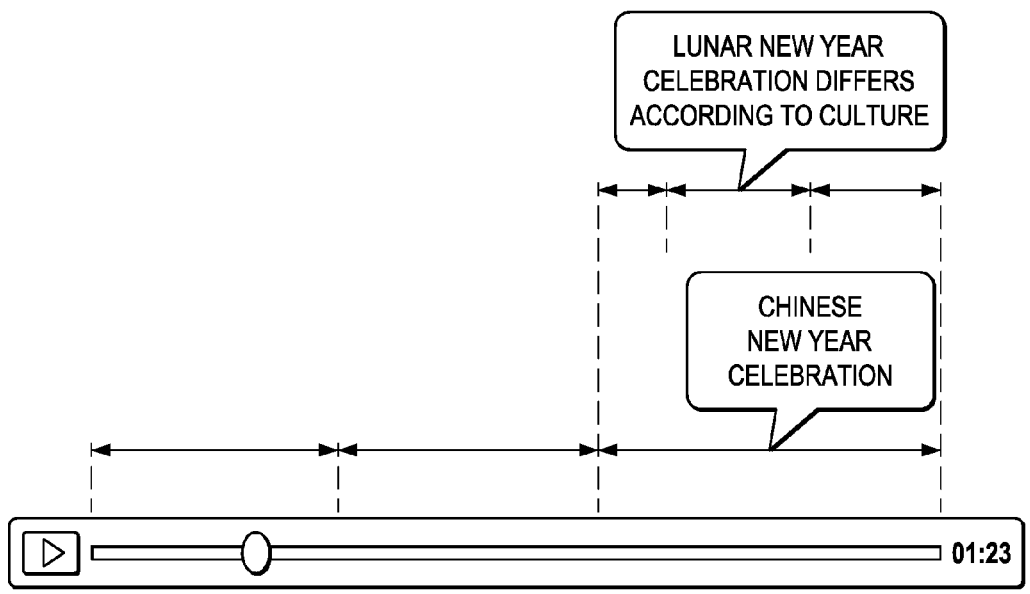

FIG. 13, which includes FIGS. 13A and 13B, illustrates one sample embodiment using aligned scrub description scheme, wherein FIG. 13A illustrates a scrub description data structure and FIG. 13B shows an example.

Embodiments of the invention use a scalable description scheme to facilitate scalable full video preview and fast preview start up. The length of the video is denoted a total time length Γ. The total time length Γ is determined for a given video stream (step 1210). Assume the level of scalability is K, i.e., there are K layers of description available for preview, from the coarsest layer 1 to the finest layer K (step 1220).

Referring to FIG. 13A, a plurality of layers (1, 2, ..., K) for the preview data D is illustrated. In each layer, the media stream length is divided into a number of time segments. The duration of the time segments decreases with increasing layer thereby increasing the amount of preview data.

The scrub description for each layer is defined over each time segment (step 1240). As schematically illustrated in FIG. 13A, the $i^{th}$ scrub description of the $k^{th}$ layer denoted as D(i, k) is defined. The $i^{th}$ scrub description of the $k^{th}$ layer D(i, k) represents the preview description covering a $i^{th}$ time segment of the $k^{th}$ layer Γ(i, k). The total number of scrub descriptions ($I_k$) in a layer k is defined. That is, $$\sum_{i=1}^{I_k} \Gamma(i,k) = \Gamma,$$

k=[1, K]. For example, as illustrated in FIG. 13A, the first scrub description of the first layer D(1, 1) has a longer time segment than the first scrub description of the second layer D(1, 2).

In various embodiments, the scrub description of layer k may be either aligned or not aligned with the scrub description of layer k−1. Here, if for i=[1,$I_k$], $$\Gamma(i,k) = \sum_{i^*=j}^{J_i} \Gamma(i^*, k-1),$$

layer k−1 is deemed to be aligned to layer K. To facilitate localized scalability, most embodiments of the invention use an aligned scheme.

FIG. 13B illustrates an example using the embodiments of the scrub description data structure described above. As illustrated in FIG. 13A, the first layer is divided into three time segments while the second layer is divided into seven time segments. Each time segment in each layer contains a scrub description. For example, the first scrub description in the first layer is "Toyota recalls." As illustrated in FIG. 13B, a user may be able to preview the third scrub description of the first layer D(3,1) or the sixth scrub description of the second layer D(6,2).

To improve user experience, especially personalized preview experience, a second dimension scalability, description scalability is also desirable. That is, instead of a single scrub description D(i, k), H degrees of description D(h, i, k) may be implemented for the $i^{th}$ scrub description of the $k^{th}$ layer. The lowest degree (h=1) may use the shortest description, i.e., the most abstract version of the description. The highest degree (h=H) may use the longest description, i.e., the most detailed version of the description.

Figure 14:
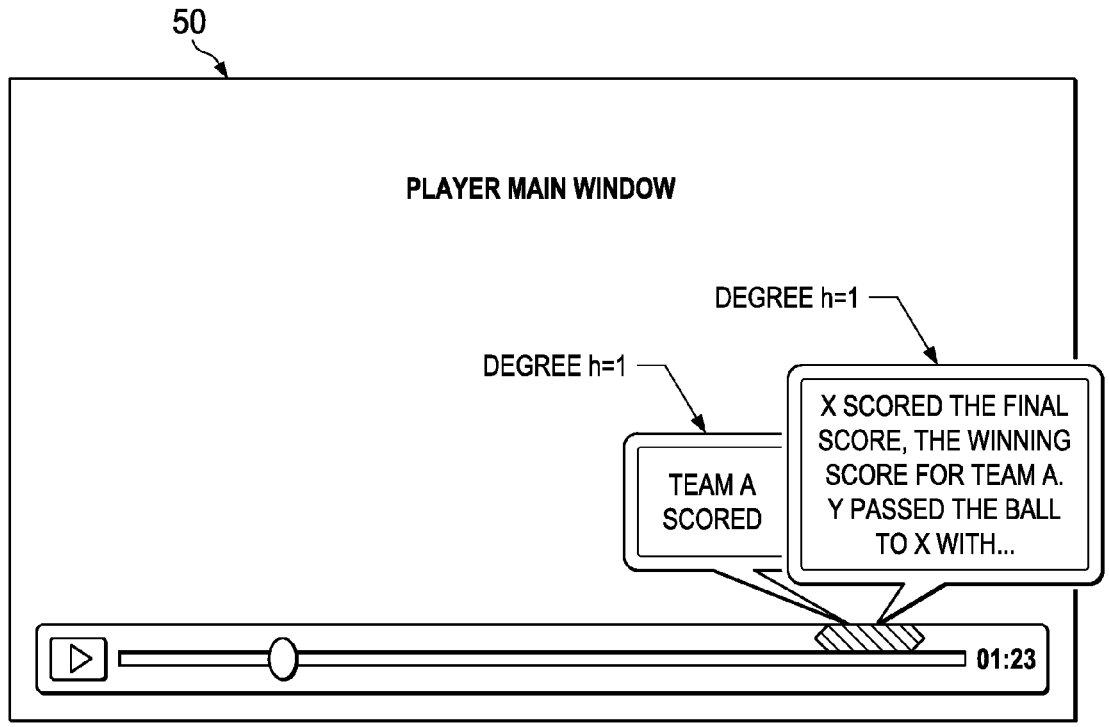
FIG. 14 illustrates one sample embodiment illustrating more than one degree of freedom of scrub description.

FIG. 14 illustrates one sample embodiment showing more than one degree of freedom of scrub description. In FIG. 14, two degrees of freedom is selected and therefore two preview windows are displayed by the media player 50. In various embodiments, the scrub preview degree may be selected based on the specific user preference profiles. Alternatively, in one embodiment, the lowest description (h=1) may be displayed by default until the end user specifies (or alternatively requests) a different degree for display. A user may also easily toggle the views for different description details, i.e. different degree views, using hot keys or control buttons.

Evidently, $i^{th}$ time segment of the $k^{th}$ layer Γ(i, k) helps to foster the alignment between scrub description D(h, i, k) or D(i, k) and the original media content. To enable fast playback, a multi-layer media segmentation scheme followed by the multilayer scrub description generation process maybe employed in various embodiments.

To enable a quality preview experience, the scrub description D(i, k) should accurately describe the content stream within the time frame Γ(i,k). To achieve that, many scrub description D(i, k) extraction schemes may be used as known to one skilled in the art. For example, the extraction scheme may be selected based on preprocessing the media stream.

In one sample embodiment, scrub description D(i, k) maybe generated using the content description metadata. Content description metadata may be generated from many different sources including manual annotation, semi-automatic annotation, and automatic annotations which may include video content analysis, audio content analysis, text analysis, and speech recognition. Some part of the content description metadata may also be collected using web crawling.

To achieve fast media preview even in narrow bandwidth conditions, the scrub description D(i.k) should, in general, be small in size while content description metadata for different content may vary in size. Hence a scrub description extraction process is often necessary to generate scrub description D(i,k) for a given video. Many different extraction schemes can be used in various embodiments. In one or more embodiments, semantic and context based analysis may be used for providing the best extraction results. Alternatively, in some embodiments, key phrase based extraction may provide an easy to implement and fast executable scheme. The present invention does not limit the type of extraction schemes that can be used for scrub description D(i,k) generation.

To improve user experience, a layered flexible description scheme may be used in various embodiments. For instance:

```
<scruball>
    <scrub class = 'description' degree=2 ......>
        <degree 1>......
        </degree 1>
        <degree 2>.......
        </degree 2>
</scruball>
```

The scrub descriptions of different layers and different degrees may be saved in the same file or different files depending on different configuration requirements. Noticeably, in most cases, it is desirable to save the descriptions in the same layer into the same file to reduce management and delivery cost.

Once the scrub description data is extracted, the manifest file and an index file to facilitate description based scrub preview shall be generated.

The index file listing the data structure of the scrub description is generated (step 1250). Information such as total number of layers K, total number of scrub descriptions ($I_k$) in a layer k, and time segments $\Gamma(i, k)$ maybe saved in the index file. Using the index file, a media player can easily and quickly allocate the scrub description data. The index file indicates explicitly the location of scrub description D(h, i, k) enabling the player to quickly extract the scrub description from the scrub description file and display in an user friendly manner for preview.

A manifest file is generated (step 1260). The manifest file may include different description and metadata to facilitate different uses of the description based scrub preview. For instance, the preview files location, the overall metadata, such as title, genre, and producer info, and some scene description info, annotations, etc., may be included in the manifest file. Noticeably, although, in one embodiment, the manifest file is packaged separately from the scrub description data file, in another embodiment, it may be packaged into the same file. Also, in one embodiment, the manifest and the index file maybe compliant with the original scrub preview manifest and index files whereas in another embodiment they may be different.

Figure 15:
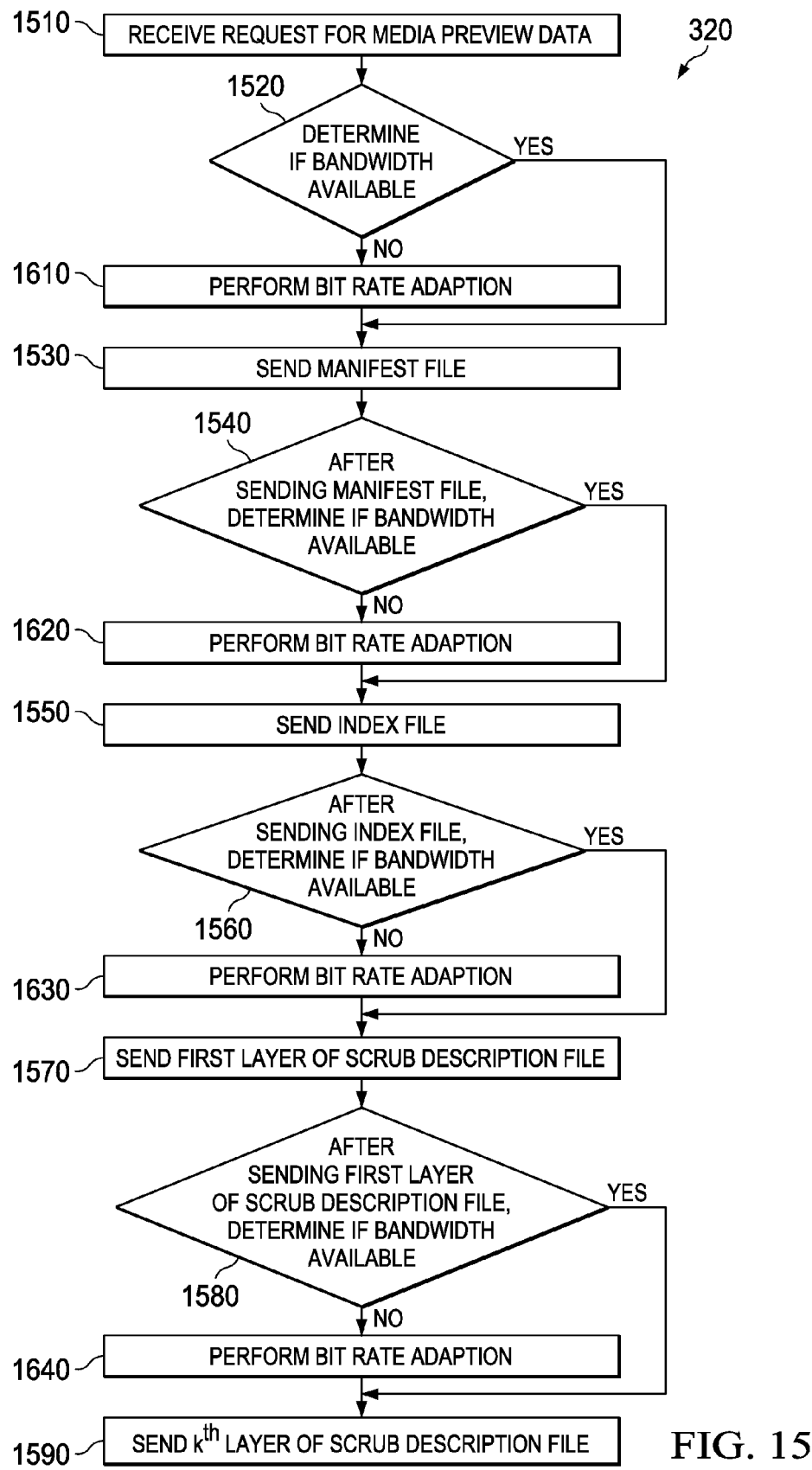
FIG. 15 illustrates a scheduling algorithm for a standalone preview system for the operations of the preview description delivery in accordance with an embodiment of the invention.
Figure 16:
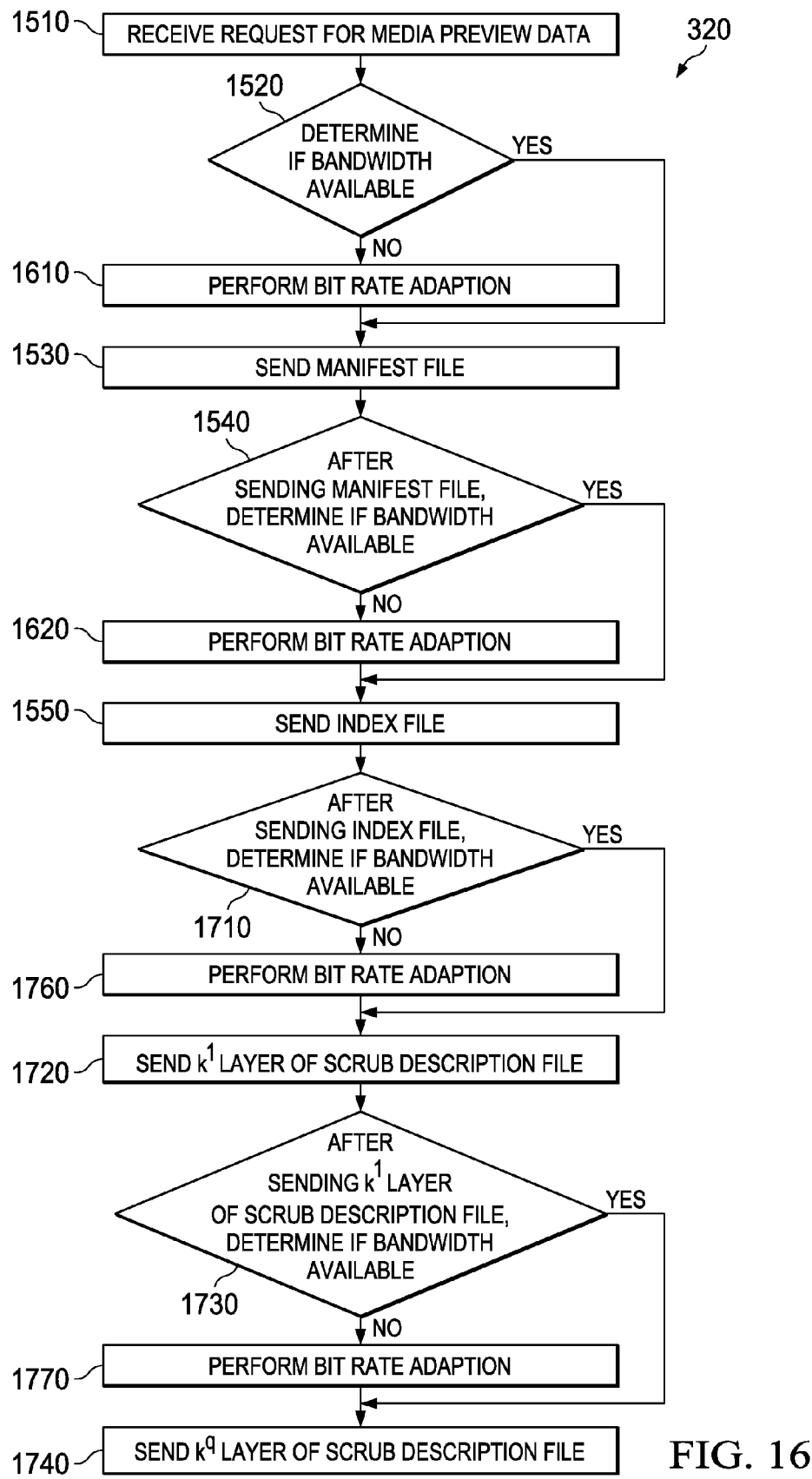
FIG. 16 illustrates a scheduling algorithm for a standalone preview system for the operations of the preview description delivery in accordance with an embodiment of the invention, wherein the scheduling algorithm delivers granular layers from within the layers of the scrub description data.

FIGS. 15 and 16 illustrate a detailed description of the operations of the PDD 320 (FIG. 11) in accordance with embodiments of the invention.

For the following description, assume $T_0$ is the time when a video stream Vm is being delivered from the edge server to the client for playback, $\Delta T$ is the minimum buffer length for the player to start video playback, $T^D_M$ is the starting time of the scrub description manifest file being delivered, $T^{D*}_M$ is the ending time of the manifest file being delivered, $T^D_I$ is the starting time of the scrub description index file being delivered, $T^{D*}_I$ is the ending time of the index file being delivered, $T^D(k)$ is the starting time of the $k^{th}$ scrub description data being delivered, and $T^{D*}(k)$ is the ending time of the $k^{th}$ scrub description data being delivered. Let $B^{th}(t)$ denote the available bandwidth between the server and the client for content delivery at time t, $R_p(t)$ denote the media player playback bitrate for Vm at time t, $R_{vm}(t)$ denote the minimum delivery bitrate of Vm at time t to prevent playback jitter at the client, $R^D(t)$ denote possible delivery bitrate of the preview file data stream at time t, and $\Delta R$ is a heuristic bitrate offset value to deal with short time bandwidth variations.

In the following sample embodiment, we assume different layers of the scrub description data are packaged in different files where $F^D(k)$ denotes the $k^{th}$ layer scrub description data file with size $SF^D(k)$. The manifest file with a file size $SF^D_M$ is denoted as $F^D_M$, and the index file with the file size $SF^D_I$ is denoted as $F^D_I$. A skilled in art can easily modify the embodiment when different layers of the scrub description data are packaged in a single preview file or when different degrees of the scrub description data are packaged in separate files. The minimum buffer length $\Delta T$ is governed by many factors, such as the GOP size of a compressed video. Since there are many literatures available in the field, a skilled in the art should be able to calculate minimum buffer length $\Delta T$ based on the specific application requirement. Hence, a specific algorithm is not provided here.

FIG. 15 illustrates a scheduling algorithm for a standalone preview system for the operations of the preview description delivery in accordance with an embodiment of the invention.

At a first step 1510, the bit rate at the starting time $B^{th}(T_0)$ is compared with the minimum delivery bitrate of Vm at the starting time to prevent playback jitter at the client $R_{vm}(T_0)$. If the available bandwidth is positive after allowing for a margin for various fluctuations, the scrub data file will be transmitted. In contrast, if there is no available bandwidth, bit rate adaptation will be undertaken as explained below in step 1610. The first file to be transmitted is the manifest file, which is transferred at a rate set by the available bandwidth (Step 1530). Accordingly, at step 1520, at $t=T^D_M=T_0$, if $B_{th}(t)>R_{vm}(t)$, start delivering manifest file $F^D_M$ with rate $R^D_M$, where $R^D_M=R^D(T_0)-\Delta R$, & $R^D(T_0)=B_{th}(T_0)-R_{vm}(T_0)$. If $B_{th}(T_M)-R_{vm}(T_M)$ is not positive, additional bit rate adaptation may be necessary and therefore go to Step 1610. At step 1610, bitrate adaptation is performed such that $B_{th}(t)>R_{vm}(t)$. Then delivery of the manifest file $F^D_M$ is started.

The time after completing the delivery of the manifest file $F^D_M$ with rate $R^D_M$ is $$T^{D*}_m = T_0 + \frac{SF^D_M}{R^D_M},$$

Therefore, at this ending time, the transmission of the index file is started (Steps 1540 and 1550) provided there is sufficient bandwidth. In other words, at time $$t = T^{D*}_M = T^D_I \ \& \ T^D_I = T_0 + \frac{SF^D_M}{R^D_M},$$

if $B_{th}(t)>R_{vm}(t)$, start delivering index file $F^D_I$ with rate $R^D_I=R^D(T_M)-\Delta R$, & $R^D(T_M)=B_{th}(T_M)-R_{vm}(T_M)$. If $B_{th}(T_M)-R_{vm}(T_M)$ is not positive, additional bit rate adaptation may be necessary and therefore go to Step 1620. At step 1620, bitrate adaptation is performed such that $B_{th}(t)>R_{vm}(t)$. Then delivery of the index file $F^D_I$ is started.

The time after completing the delivery of the index file $F^D_I$ is the end time $$T^{D*}_I = T_0 + \frac{SF^D_M}{R^D_M} + \frac{SF^D_I}{R^D_I}.$$

Therefore, at this ending time, if there is sufficient bandwidth, i.e., $B_{th}(t)>R_{vm}(t)$, the sending of the first layer of the scrub description file $F^D(1)$ is started (Steps 1560 and 1570), i.e., at $$t = T^{D*}_I = T^D(1) \ \& \ T^D(1) = T_0 + \frac{SF^D_M}{R^D_M} + \frac{SF^D_I}{R^D_I},$$

if $B_{th}(t)>R_{vm}(t)$, start delivering $F^D(1)$, with rate $R^D=R^D(T_I)-\Delta R$, & $R^D(T_I)=B_{th}(T_I)-R_{vm}(T_I)$. Again, if however if $B_{th}(t)<R_{vm}(t)$, the go to Step 1630 for further adjustments. At step 1630, bitrate adaptation is performed such that $B_{th}(t)>R_{vm}(t)$. Then delivery of the first layer of the scrub description file $F^D(1)$ is started.

After completing the sending of the first layer of the scrub description file, the higher layers of the scrub description data are sent if there is sufficient bandwidth (Steps 1580 and 1590), i.e., $B_{th}(t)>R_{vm}(t)$. In other words, at $t=T^{D*}(k-1)=T^D$ (k), if $B_{th}(t) > R_{vm}(t)$, start delivering $F^D(k)$, k=2, 3, . . . . If not, go to step 1640 for adjustments. At step 1640, bitrate adaptation is performed such that $B_{th}(t) > R_{vm}(t)$. Then delivery of the $k^{th}$ layer of the scrub description file $F^D(k)$ is started.

When different degrees of the scrub descriptions are packed in different files, one added flexibility is to deliver the lowest degree first to further save bandwidth and deliver the higher degree ones on demand or only when there is extra bandwidth. The schedule algorithm can be easily modified accordingly.

FIG. 16 illustrates a scheduling algorithm for a standalone preview system for the operations of the preview description delivery in accordance with an embodiment of the invention, wherein the scheduling algorithm delivers granular layers from within the layers of the scrub description data.

In this embodiment, unlike the embodiment of FIG. 15, layers of the scrub description data D(i,k) are not delivered sequentially for k=[1,K]. Instead, a particular set of layers, $k^1, k^2, \ldots k^Q$, is picked based on a decision criteria. In one embodiment, the decision criteria is selected as $$k^q = K \frac{g^q}{Gn}$$

where granularity selection parameter $g^q$, $q \in [1,Q]$ defines the granularity levels, and Gn defines the total levels of granularities. The granularity selection parameter $g^q$ may be specified by the user, a user preference function, a bandwidth adaptation function, or other functions that can jointly optimize resource and user preferences.

Referring to FIG. 16, the operations proceed similar to FIG. 15 in transferring the manifest file and the index file. Therefore, at steps 1510 and 1520, at time $t = T^D_M = T_0$, if $B_{th}(t) > R_{vm}(t)$, delivery of manifest file $F^D_M$ is initiated with a rate $R^D_M$, where $R^D_M = R^D(T_0) - \Delta R$, & $R^D(T_0) = B_{th}(T_0) - R_{vm}(T_0)$. Otherwise at step 1610, bitrate adaptation is performed such that $B_{th}(t) > R_{vm}(t)$. Then delivery of the manifest file $F^D_M$ is started.

At steps 1530 and 1540, and as described above, at time $$t = T^{D*}_M = T^D_I \ \& \ T^D_I = T_0 + \frac{SF^D_M}{R^D_M},$$

if $B_{th}(t) > R_{vm}(t)$, delivery of index file $F^D_I$ is started with a rate $R^D_I$, where $R^D_I = R^D(T_M) - \Delta R$, & $R^D(T_M) = B_{th}(T_M) - R_{vm}(T_M)$. Otherwise, at step 1620, bitrate adaptation is performed such that $B_{th}(t) > R_{vm}(t)$. Then delivery of the index file $F^D_I$ is started.

Unlike the embodiment described in FIG. 15, the first layer of the scrub description file is not transmitted. Rather, the $k^1$ layer will be transmitted. The time after completing the delivery of the index file $F^D_I$ is the end time $$T^{D*}_I = T_0 + \frac{SF^D_M}{R^D_M} + \frac{SF^D_I}{R^D_I}.$$

Therefore, at this ending time, if there is sufficient bandwidth, i.e., $B_{th}(t) > R_{vm}(t)$, the sending of the $k^1$ layer of the scrub description file $F^D(k^1)$ is started (Steps 1710 and 1720). In other words, at time $$t = T^{D*}_I = T^D(k^1) \ \& \ T^D(k^1) = T_0 + \frac{SF^D_M}{R^D_M} + \frac{SF^D_I}{R^D_I},$$

delivery of the $k^1$ scrub description data is started with rate $R^D$ if $B_{th}(t) > R_{vm}(t)$. Here, $R^D = R^D(T_I) - \Delta R$, & $R^D(T_I) = B_{th}(T_I) - R_{vm}(T_I)$. Otherwise, at step 1760, bitrate adaptation is performed such that $B_{th}(t) > R_{vm}(t)$. Then delivery of the $k^1$ layer of the scrub description file $F^D(k^1)$ is started.

After completing the delivery of the $k^1$ layer of the scrub description file $F^D(k^1)$, the next assigned layer ($k^q$) (q=2) of the scrub description file is sent if there is sufficient bandwidth (steps 1730 and 1740). In other words, at time $t = T^{D*}(k^{q-1}) = T^D(k^q)$, delivery of the $k^q$ scrub description data is started if $B_{th}(t) > R_{vm}(t)$. Subsequent assigned layers of the scrub description (q=3, 4, . . . ) may be sent similarly. Otherwise, at step 1770, bitrate adaptation is performed such that $B_{th}(t) > R_{vm}(t)$. Then delivery of the $k^q$ layer of the scrub description file $F^D(k^q)$ is started.

Similarly, when different degrees of the scrub descriptions are packed in different files, only the file that contains the first degree description shall be delivered while the higher degree ones are transported on demand or only when there is extra bandwidth.

In one or more embodiments, the preview description files may be saved in different server(s) instead of the original media. In this case, $B_{th}(t)$ should be defined as the minimum available bandwidth between the media server and the client and that between the preview description server and the client.

A detailed description and sample embodiments for a PDR 330 (FIG. 11) will now be described using FIG. 17.

Figure 17:
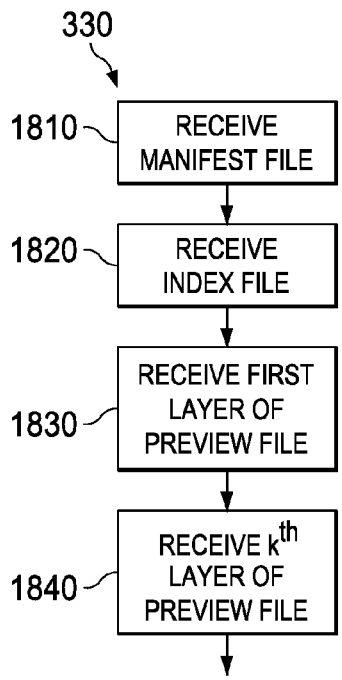
FIG. 17 illustrates a sample embodiment of a preview description rendering process at a media player receiving preview data in accordance with an embodiment.

FIG. 17 illustrates a sample embodiment of a PDR 330 at a media player receiving preview data in accordance with an embodiment.

To ensure playback at any preview points without any glitch, alignment between the scrub description and the original media stream is needed. As discussed in the PDG section above, time segments Γ(i, k), which are registered in the index file, facilitate synchronization.

In the following sample embodiment, the scrub description data are packaged based on the location of the scrub description. That is, scrub description D(h, i, k) for $h \in [1, H]$ & $i \in [1, I_k]$ are packaged in the same file. H is the maximum degree of freedom as described above. $I_k$ is the total number of scrub descriptions in layer k. Again, a person skilled in the art can easily modify the embodiment when all scrub description D(h, i, k) for $I \in [1, I_k]$ and $k \in [1, K]$ are packaged into a single file or when for $h \in [1, H]$ are packaged in H different files.

Referring to FIG. 17, the media player receives the manifest file (step 1810). Next, the media player receives the index file (step 1820). If the scheduling algorithm described with respect to FIG. 15 is used, the media player downloads the $1^{st}$ layer preview file (step 1830). Subsequently, the media player downloads the $k^{th}$ layer preview file (step 1840).

Figure 18:
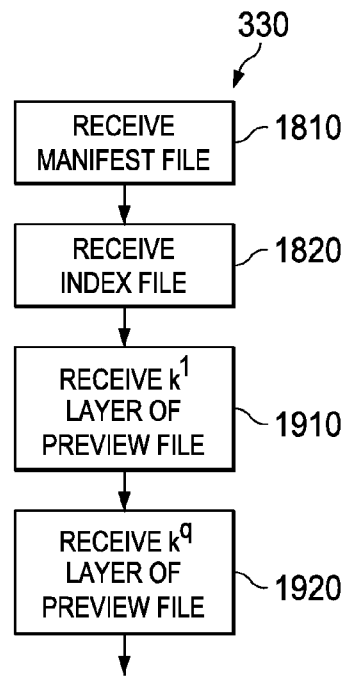
FIG. 18 illustrates a sample embodiment of a preview description rendering process at a media player receiving preview data in accordance with an embodiment, wherein the media player receiver granular layers from within the layers of the scrub description data.

FIG. 18 illustrates a sample embodiment of a PDR 330 at a media player receiving preview data in accordance with an embodiment.

FIG. 18 illustrates a media player receiving preview data from a server using the PDD algorithm illustrated in FIG. 16 while FIG. 17 illustrates a media player receiving preview data from a server using the PDD algorithm illustrated in FIG. 15. Therefore, referring to FIG. 18, the Steps of 1810 and 1820 indicating the receipt of the manifest and index files remain the same as in the prior embodiment. Referring to Step 1910, $k^1$ layer preview file is received. Next, the media player downloads the $k^q$ layer preview file. As described above, $k^1$, $k^q$ layers are not delivered sequentially and may be selected using various criterion.

Figure 19:
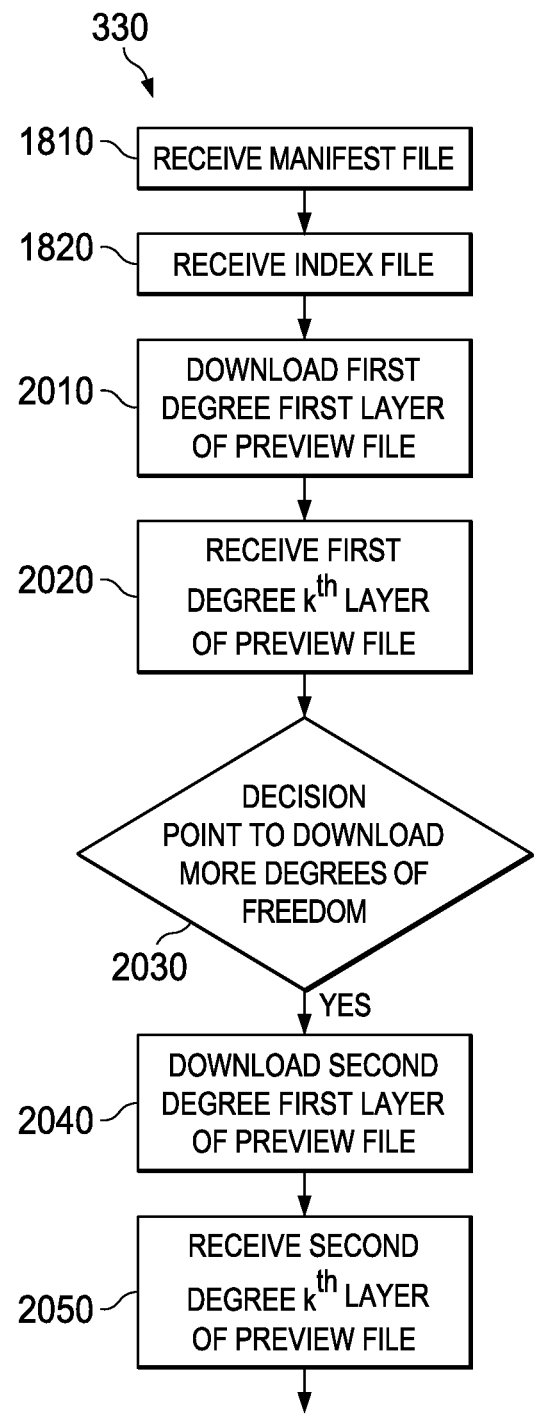
FIG. 19 illustrates a media player receiving preview data having multiple degrees of freedom in accordance with an embodiment of the invention.

FIG. 19 illustrates a media player receiving preview data having multiple degrees of freedom in accordance with an embodiment of the invention.

Referring to FIG. 19, when the scrub description data with multiple degrees of freedom D(h,i,k) for h∈[1,H] are packaged in different files, multiple files have to be downloaded. Accordingly, a first set of files are downloaded for the first degree of freedom. As in previous embodiments, the manifest file and the index file are received (Steps 1810 and 1820). Next, the first degree of the first layer preview data is received (Step 2010) following by the first degree of the $k^{th}$ layer of the preview data (Step 2020).

At client's request or when additional bandwidth is detected (Step 2030), the media player starts to download the additional degree preview files in order from h=2 to h=H (Steps 2040 and 2050). The media player does not always need to download all the scrub description data files described in the manifest file. The number k may be decided based on user preference, the network conditions, the end to end available bandwidth and possibly other factors defined by the media player.

With a first layer scrub description data file, a user can get a coarse grain preview experience. After getting the following layers of scrub description data files, the user can enjoy finer grain preview experiences. In the meantime, with a first degree scrub description, a user gets some rough description and when additional descriptions are downloaded detailed description at each segment in each layer can be obtained.

For fast preview startup, the first layer scrub description data could be delivered before or right after the video starts to play back in various embodiments. Since the scrub description data is small by design, users can begin with the preview almost instantly. Based on user preference, the scrub description data might even be delivered before any of the original media data stream is being delivered. In this case, users can start browsing (preview) the story while the original media data stream is being buffered for playback. This is an alternative way to reduce user waiting time and hence improves the overall video access experience.

To facilitate instant playback from any scrub preview point D(i*, k), time segments Γ(1, k), Γ(2, k) . . . Γ(i*−1, k) are obtained from the index file. The end of all time segments available, which is the available preview length, be denoted as t*, which can be defined as $$t^* = \sum_{i=1}^{i^*-1} \Gamma(i,k).$$

The available preview length t* is compared with the buffer. If the available preview length t* runs outside of the buffer, the media player may communicate with the edge server immediately to acquire the corresponding media segments from the original media data stream server to facilitate instant startup. Otherwise, the playback starts immediately at the original media segment that corresponds to t*.

Another possible embodiment of the stand-alone implementation takes advantage of the audio channel. That is, the scrub descriptions are played back in audio similar to a narrator instead of displayed as text. In this embodiment, still, multiple degrees and multiple layers of scrub previews can be facilitated and a skilled in the art can implement similar algorithms for PDG, PDD, and PDR.

Another embodiment that includes an add-on implementation will now be described. In this case, the scrub descriptions can be used as one or more added layers to the keyframe based scrub preview. In this embodiment, the scrub description data may be scheduled for delivery first with the first layer of the keyframes delivered next. For instance, the first layer of the preview keyframes can be scheduled for delivery at $T^{D^*}(K)$ or $T^{D^*}(K^Q)$ using similar algorithms as described in FIG. 15 or FIG. 16. When scrub descriptions are added as additional layers to the keyframe based scrub preview, the scrub description and the keyframe images may not need to be synchronized.

Figure 20:
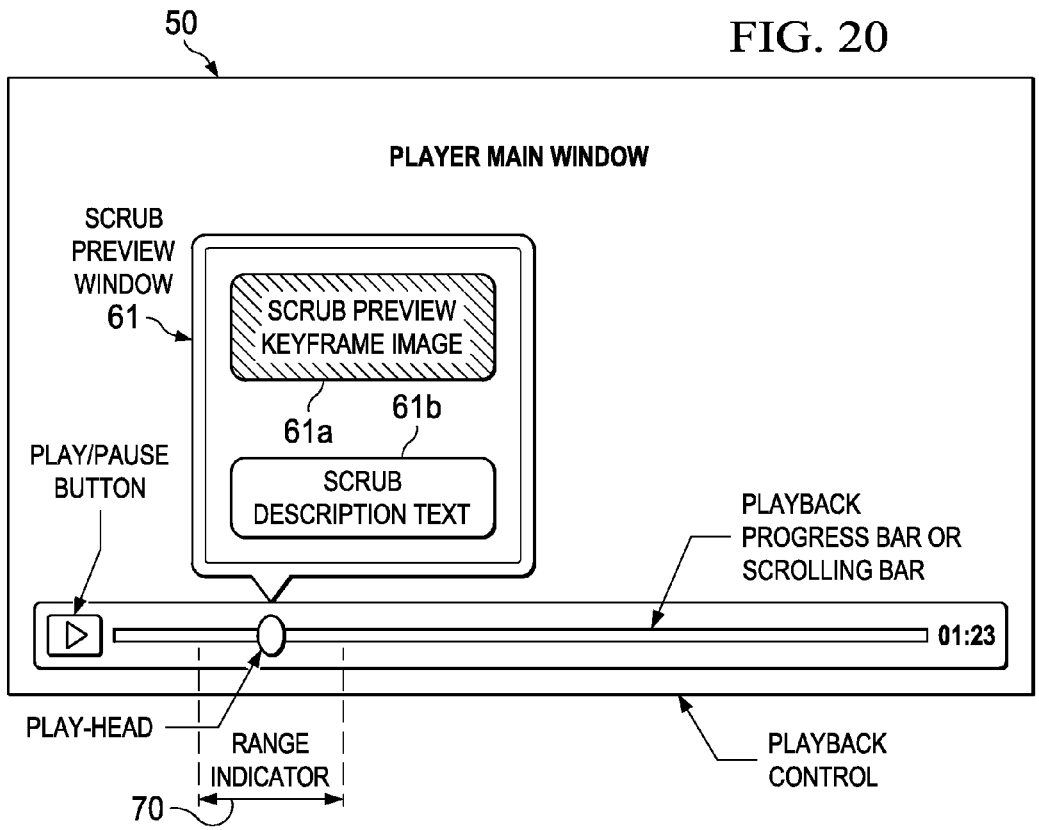
FIG. 20 illustrates a sample interface for a dual-view scrub preview in accordance with an embodiment of the invention.

FIG. 20 illustrates a sample interface for a dual-view scrub preview in accordance with an embodiment of the invention. In this embodiment, both dual-view and toggled view can be realized using the dual view implementation. When a dual-view scrub preview is implemented, the preview keyframe and the corresponding scrub description text of a particular time frame of the video stream are displayed in a dual-view scrub preview window 61 as illustrated in FIG. 20. The dual-view scrub preview window 61 includes a scrub description text window 61a and a keyframe image 61b.

In various embodiments, the dual-view scrub preview window 61 may be configured differently in terms of the relative location of the scrub description text window 61a versus the location of the keyframe image 61b. For example, the user at the media player may configure the locations and view of the scrub description text window 61a and the keyframe image 61b. Embodiments of the present invention do not limit the type of configurations of the preview window.

In addition, in one or more embodiments, the description text for preview may be presented in audio format (in addition to or in place of the text format which is illustrated). The audio description has to start from the position where the playhead is moved to and paused at. In some embodiments, the preview images may be enhanced to be a series of short video clips which will auto-play when the playhead is scrubbed.

Often when video content is relatively long and the description texts are scattered along the progress bar, marker (range indicator 70, e.g., as illustrated in FIG. 20) may be introduced along the progress bar to facilitate the preview and content navigation efforts. In various embodiments, the description text can be tailored to country/region where the viewing is being requested so that correct language option can be made available (based on GPS, client location as seen from CDN, or user request from the media player).

In a toggled view scrub preview implementation, in one embodiment, either the keyframe image or the scrub description text/audio will be displayed in the scrub preview window. The view can be toggled from one type to the other using a hot key combination or other access method.

In the dual view scrub preview implementation, the scrub description may be synchronized with the keyframe images for ease of management and fast accessibility. That is, one keyframe KF(j,k) and one scrub description D(j, k) should be extracted from the same video segment Γ(j,k). Here, keyframe KF(j,k) and scrub description D(j, k), j∈[1,$J_k$] denotes the keyframe and the corresponding scrub description of the jth segment Γ(j,k) in the kth layer preview. In contrast, the scrub description and the keyframe images need not be synchronized when scrub descriptions are added as additional layers to the keyframe based scrub preview.

Similar extraction schemes for scrub description D(j, k) described earlier, e.g., FIGS. 12-14, may be used in this embodiment. The keyframes KF(j,k) may be extracted using any suitable scheme known to one skilled in the art. For each layer, all keyframes KF(j,k)s and scrub description D(j, k)s for j∈[1,J$_k$] may be packaged into a single dual view scrub data file $F^{DL}(k)$ or packaged separately in various ways. In the following description, one single file per layer is used as an example. A single manifest file and a single index file may be generated for the entire preview data set that includes both the keyframes and the scrub descriptions in all layers.

For the preview delivery step, a slightly modified scheduling algorithm based on those described in FIGS. 15 and/or 16 may be employed. First, the manifest file and the index file are delivered. Then, the dual view scrub data file $F^{DL}(k)$ may be delivered in a layer by layer fashion with the lower layers delivered first.

At the media player side, the media player may download the dual view scrub data file $F^{DL}(k)$ after the manifest file and the index file are downloaded, starting from k=1. A toggled view or a dual-view scrub preview is achieved by displaying keyframes KF(j,k) and scrub data D(j, k) during the corresponding time frame Γ(j,k) in a toggled view or a dual-view fashion.

Figure 21:
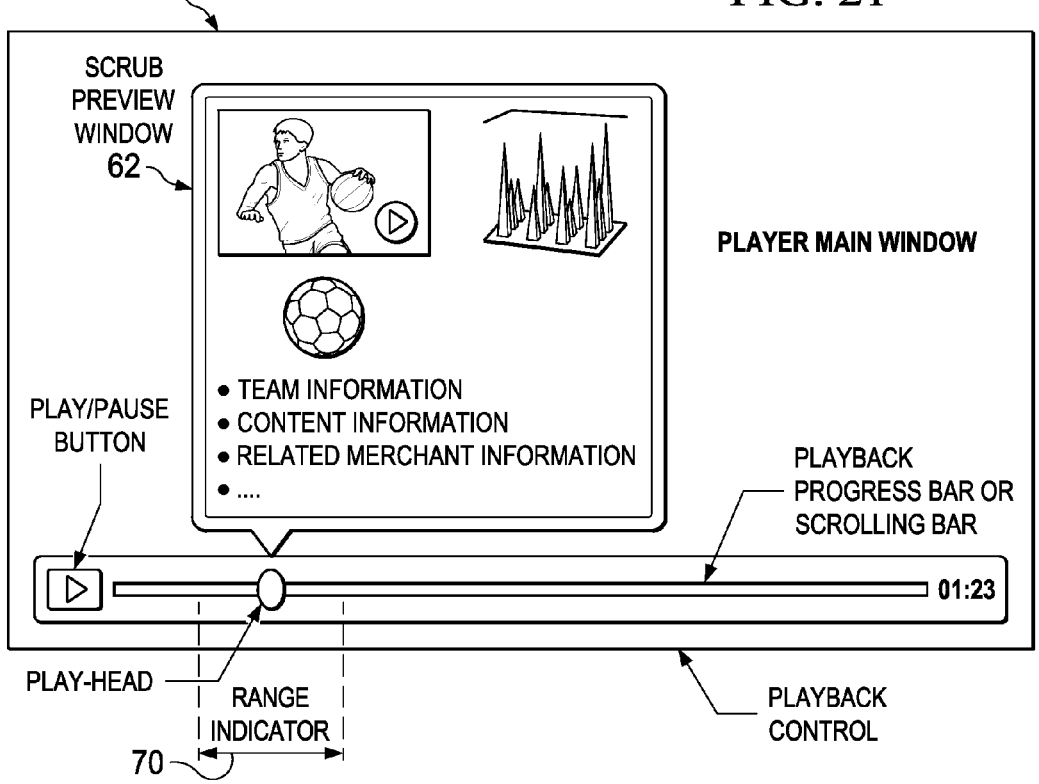
FIG. 21 illustrates a media player rendering a media rich scrub preview window in accordance with an embodiment of the invention.

An embodiment of the invention describing the use of pertinent rich media scrub preview will now be described using FIG. 21. FIG. 21 illustrates a media player 50 rendering a media rich scrub preview window 62. In addition to the description data, it is possible to introduce other types of data or relevant information to facilitate additional scrub preview capabilities. For instance, when watching a sports game video, the users might be interested in information relevant to the sports teams or star players, recent game information, and possibly merchandize that is related to the type of sports, the game season, or the relevant teams. These and other relevant information can all serve as part of the database to generate the scrub preview. The scrub preview may be presented in a rich media format with video, image, graph, text, and any other type of media data incorporated into a single media rich scrub preview window 62 to provide preview and browsing services. A person skilled in the art can easily modify the generation, delivery, and rendering schemes discussed above in other embodiments and optimize it for this embodiment.

In yet another embodiment of the present invention, an independent preview service can be offered. Any user can subscribe to the preview service with or without the subscription to the VoD or real time video delivery service. A user subscribed to the preview service can be connected directly to the preview server at her request. The server shall deliver the preview content to the user based on her subscriber service class, the user profile, the network and device condition, etc. In this embodiment, the preview service server maybe connected to multiple video delivery servers that are part of a single or multiple IP video delivery service providers. The generic architecture of such a system may be implemented as illustrated in FIG. 10.

Figure 22:
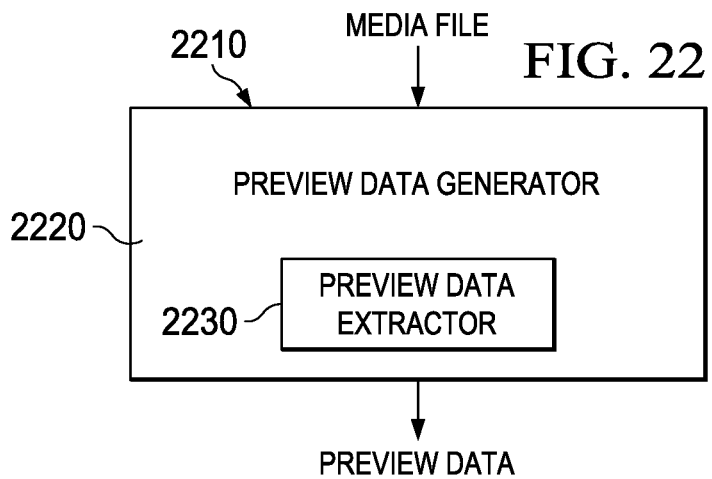
FIG. 22 illustrates a preview generation unit in accordance with embodiments of the invention.

FIG. 22 illustrates a preview generation unit in accordance with embodiments of the invention. The preview generation unit may be the PG 10 (FIG. 1) or the PDG 310 (FIG. 11) in various embodiments. Referring to FIG. 22, a preview generation unit 2210 comprises a preview data generator 2220 configured to generate a preview data. The preview data generator 2220 comprises a preview data extractor 2230 configured to extract preview information from a media file to be streamed. The preview data generator 2220 is configured to generate a preview data that has a multi-dimensional hierarchical data structure having a plurality of layers. The content of the preview information in each layer increases in moving upto higher layers of the plurality of layers. The preview data generator 2220 is configured to provide a differentiated preview service.

Figure 23:
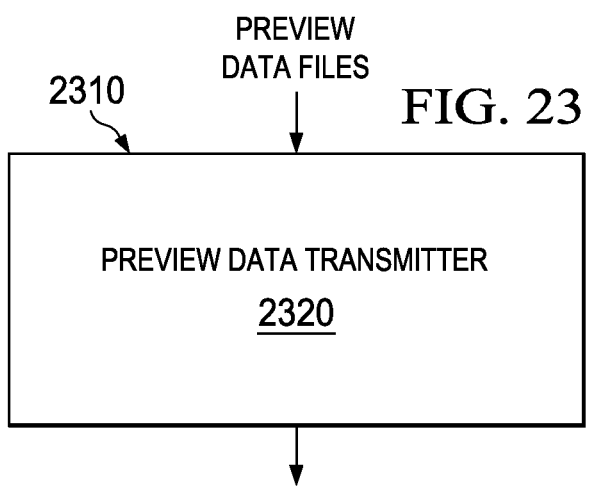
FIG. 23 illustrates a preview delivery unit in accordance with embodiments of the invention.

FIG. 23 illustrates a preview delivery unit in accordance with embodiments of the invention. The preview delivery unit may be the PD 20 (FIG. 1) or the PDD 320 (FIG. 11) in various embodiments. Referring to FIG. 23, a preview delivery unit 2310 comprises a preview data transmitter 2320 configured to send a preview data comprising preview information from a media file to be streamed. The preview data transmitter 2320 is configured to send a multi-dimensional hierarchical data structure having a plurality of layers, e.g., stored in a single or a plurality of files in a non-transitory non-volatile storage medium. The content of the preview information in each layer increases in moving up to higher layers of the plurality of layers. The preview data transmitter 2320 is configured to provide a differentiated preview service.

Figure 24:
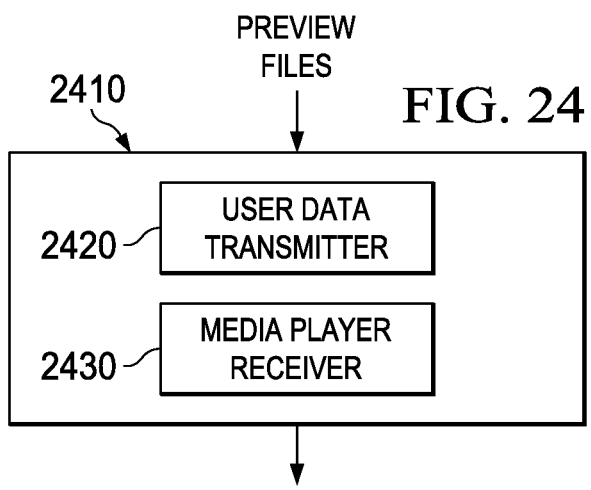
FIG. 24 illustrates a preview receiver unit in accordance with embodiments of the invention.

FIG. 24 illustrates a preview receiver unit in accordance with embodiments of the invention. The preview receiver unit may be the PR 30 (FIG. 1) or the PDR 330 (FIG. 11) in various embodiments. Referring to FIG. 24, a preview receiver unit 2410 comprises a user data transmitter 2420 configured to send a preview data request to a preview server. The preview data request comprises a request for preview data. The preview receiver unit 2410 further comprises a media player receiver 2430 configured to receive a preview data comprising preview information. The received preview data comprises a multi-dimensional hierarchical data structure having a plurality of layers with increasing content of the preview information in each layer of the plurality of layers.

Figure 25:
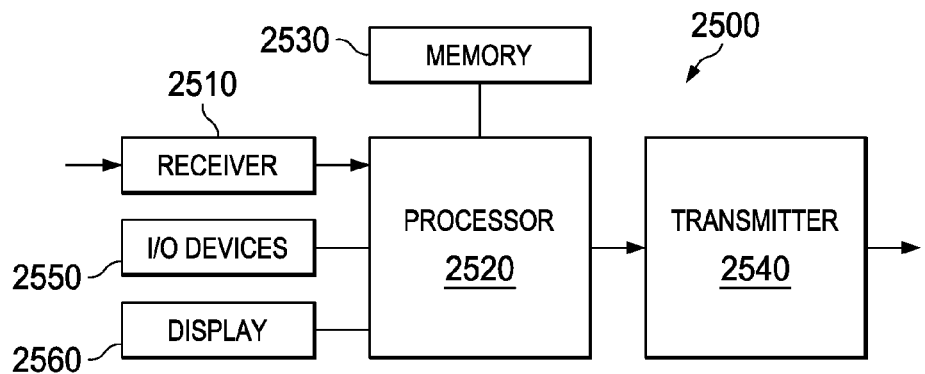
FIG. 25 illustrates a representative a preview server in accordance with embodiments of the invention.

FIG. 25 illustrates a representative a preview server in accordance with embodiments of the invention.

The preview server 2500 includes a receiver 2510, which may include a wireless antenna receiver and/or a wired network connection port for receiving the media content, for example, if it is stored at a remote location. The preview server 2500 also includes a memory 2530, which may include both a non-volatile memory and a volatile memory. In one embodiment, instructions for performing the operations described with respect to FIGS. 1, 8, 9, 11, 12, 15-16 may be stored in a non-transitory storage medium such as a magnetic storage medium or a solid state storage medium in the memory 2530.

The preview server 2500 may include further I/O devices 2550 for inputting and outputting data. For example, the I/O devices 2550 may include an optical disc such as a laser readable medium, for example, a compact disc reader, a blue ray disk reader, and/or digital video reader etc. In one or more embodiments, the instructions for performing the operations as described in FIGS. 1, 8, 9, 11, 12, 15-16 may be stored in an optical disc, which is a non-transitory storage medium.

The preview server 2500 may also include a display 2560 and a transmitter 2540 for transmitting the preview data. The transmitter 2540 may include plurality of wireless antennas and/or a wired port. The transmitter 2540 and the receiver 2510 can be combined together in some embodiments.

The preview server 2500 includes a processor 2520 configured to execute the instructions for performing the operations described with respect to FIGS. 1, 8, 9, 11, 12,

15-16 as well as FIGS. 22 and 23. The processor 2520 may comprise a single processor or a plurality of processors.

Figure 26:
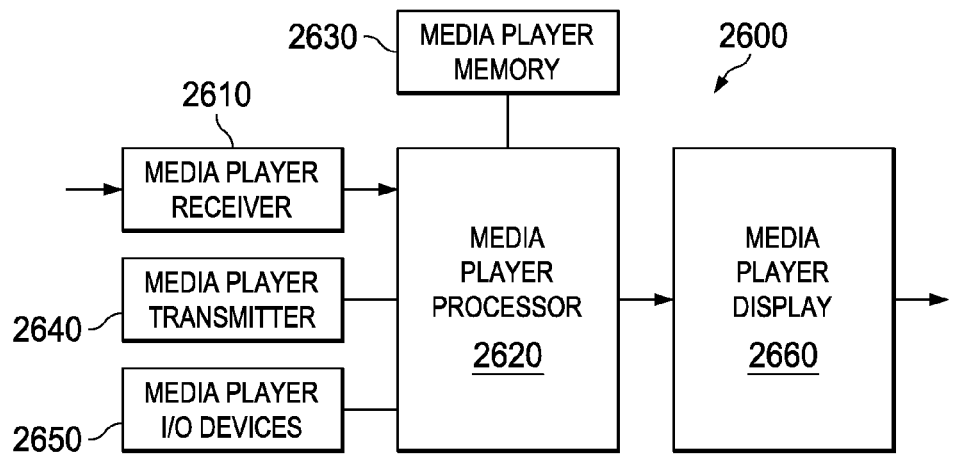
FIG. 26 illustrates a representative a media player in accordance with embodiments of the invention.

FIG. 26 illustrates a representative a media player in accordance with embodiments of the invention.

The media player 2600 includes a media player (MP) receiver 2610, which may include a wireless antenna receiver and/or a wired network connection port for receiving the media content, for example, if it is stored at a remote location. The MP receiver 2610 may be used by the media player 2600 to receive the preview data files. The media player 2600 also includes a MP memory 2630, which may include both a non-volatile memory and a volatile memory. In one embodiment, instructions for performing the operations described with respect to FIGS. 1, 10-11, 17-19, and 24 may be stored in a non-transitory storage medium such as a magnetic storage medium or a solid state storage medium in the MP memory 2630.

The media player 2600 may include further MP I/O devices 2650 for inputting and outputting data. For example, the MP I/O devices 2650 may include an optical disc such as a laser readable medium, for example, a compact disc reader, a blue ray disk reader, and/or digital video reader etc. In one or more embodiments, the instructions for performing the operations as described in FIGS. 1, 10-11, 17-19, and 24 may be stored in an optical disc, which is a non-transitory storage medium.

The media player 2600 may also include a MP display 2560 and a MP transmitter 2540 for transmitting the user specified parameter data. The MP transmitter 2640 may include plurality of wireless antennas and/or a wired port. The MP transmitter 2640 and the MP receiver 2610 can be combined together in some embodiments.

The media player 2600 includes a MP processor 2620 configured to execute the instructions for performing the operations described with respect to FIGS. 1, 10, 11, 17-19, as well as FIG. 24. The MP processor 2620 may comprise a single processor or a plurality of processors.

Figure 27:
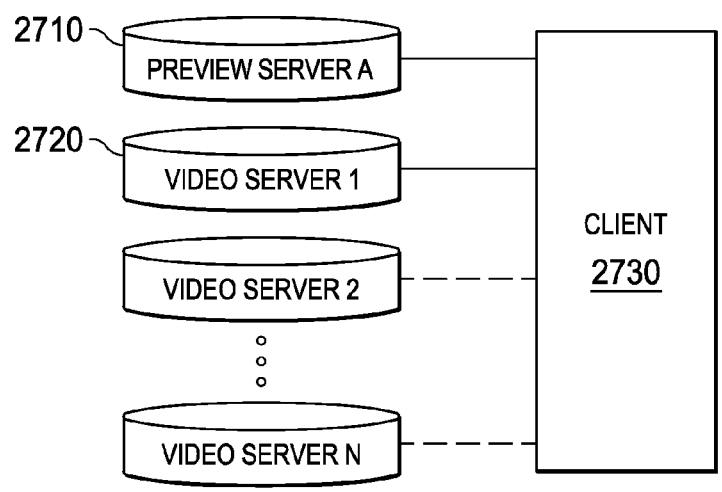
FIG. 27 illustrates a generic architecture of a system implementing the differentiated scrub preview in accordance with embodiments of the invention.

FIG. 27 illustrates a generic architecture of a system implementing the differentiated scrub preview in accordance with embodiments of the invention.

Referring to FIG. 27, a plurality of video servers 2720 may be serving a media stream to a client 2730. Upon request, a preview server 2710 may serve the client 2730 with a preview data stream. In various embodiments, the preview server 2710 may be a standalone server or may be part of a video server 2720.

Although not specifically disclosed, embodiments of the invention can be combined. For examples, embodiments described with respect to FIGS. 8-10 may be combined with the embodiments described with respect to FIGS. 11-21. For example, an integrated data structure may include both preview data type and scrub description data as different dimensions in one or more embodiments.

A number of features and advantages can be obtained from various embodiments of the invention. For example, in one aspect, the invention provides a system for description based scrub preview generation, delivery, and presentation via an online media player to facilitate fast scrub preview even when the network bandwidth is low. In another aspect, an on-demand video preview method that allows user to browse the video content, even the portion that is not currently buffered and to start browsing instantly on any terminal device and almost under any network condition including networks with very low bandwidth and/or frequent bandwidth fluctuations. This feature offers an informed viewing experience and provides convenient video browsing and searching capability with a natural drag and play functionality. In another aspect, a set of schemes for dual view preview generation, delivery, and presentation which offers both dual-view and toggled view scrub preview functionality is provided. In yet another aspect, a layered scrub description data structure, a synchronization scheme, along with a delivery scheme for fast preview startup while offering personalized preview experience is provided.

In a further aspect, a multi-degree scrub preview scheme to facilitate instant preview startup and personalized preview services is provided. In yet a further aspect, two delivery scheduling schemes can be configured for delivery at various optimal time points to minimize startup delay and playback jitter and/or configured for personalized delivery. In another aspect, a personalized description based scrub preview presentation scheduling scheme offers an alternative functionality to reduce user wait time at start up.

Embodiments of the present invention extend the scrub preview to provide ultra-fast preview startup functionality. In one or more embodiments, description based scrub preview are offered instead of keyframe based scrub preview. The preview can start instantly without affecting the playback of the video, even in very low bandwidth network conditions. In a separate embodiment, the present invention describes the systems and scheme to achieve an additional scrub preview style called dual view scrub preview that takes advantage of both the description based and the keyframe based scrub preview. The dual view scrub preview offers additional personalized service capability. Embodiments of the present invention address the system and method to realize the description based scrub preview as well as the dual view scrub previews in a networked media distribution system with an online media player.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of streaming a media preview of a media over a network, the method comprising:
   receiving a request to deliver a preview data comprising preview information for a media file being streamed to a client through the network, wherein the preview data comprises a multi-dimensional hierarchical data structure having a plurality of layers with increasing content of the preview information in each layer of the plurality of layers, wherein the preview data is configured to provide an adaptive and scalable preview service, wherein the preview data comprises scrub description information, wherein the preview data comprises a plurality of preview locations on a timeline of the media file being streamed, and wherein each preview location is associated with a corresponding time frame on the timeline of the media file being streamed; and delivering preview information to be displayed at the client through the network, wherein the preview information is from a layer of the plurality of layers of the preview data, wherein delivering preview information to be displayed at the client through the network comprises:

receiving a request for the preview data;

determining whether bandwidth is available for sending a manifest file without causing playback jitter while rendering the media file to be streamed;

sending the manifest file in response to determining that bandwidth is available for sending the manifest file; and performing bit rate adaptation and then sending the manifest file in response to determining that bandwidth is not available for sending the manifest file.

2. The method of claim 1, wherein the adaptive and scalable preview service provides a differentiated preview service.

3. The method of claim 1, wherein the preview data comprises preview data type information.

4. The method of claim 3, wherein delivering preview information to be displayed at the client through the network comprises:

receiving a service request from the client;

generating an instantaneous user service profile identifying a layer of preview data for each type of preview data;

identifying the layer of the preview data in the instantaneous user service profile to be transmitted;

extracting a specific preview information in the layer of the preview data; and sending the specific preview information to the client.

5. The method of claim 3, wherein delivering preview information to be displayed at the client through the network comprises:

receiving a user parameter from a client over the network;

defining a preview description data and/or network transmission parameters based on the user parameter; and using the defined preview description data and/or network transmission parameters, sending the preview description data to the client over the network.

6. The method of claim 1, wherein delivering preview information to be displayed at the client through the network comprises:

sending a manifest file comprising additional description and/or metadata;

sending an index file after sending the manifest file; and sending a scrub description file comprising the scrub description information, wherein the manifest file, the index file, and the scrub description file are sent without causing playback jitter while rendering the media file to be streamed, and wherein the index file describes the structure of the scrub description file.

7. The method of claim 1, wherein delivering preview information to be displayed at the client through the network further comprises:

determining whether bandwidth is available for sending an index file without causing playback jitter while rendering the media file to be streamed;

sending the index file if bandwidth is available for sending the index file, the index file being started to send after completing sending the manifest file; and performing bit rate adaptation if bandwidth is not available for sending the index file.

8. The method of claim 1, wherein delivering preview information to be displayed at the client through the network further comprises:

determining whether bandwidth is available for sending a first scrub file comprising a first layer of a scrub description without causing playback jitter while rendering the media file to be streamed;

sending the first scrub file if bandwidth is available for sending the first scrub file;

performing bit rate adaptation if bandwidth is not available for sending the first scrub file;

determining whether bandwidth is available for sending a second scrub file comprising a $k^{th}$ layer of the scrub description without causing playback jitter while rendering the media file to be streamed, wherein the $k^{th}$ layer is any layer from the plurality of layers of the multi-dimensional hierarchical data structure;

sending the second scrub file if bandwidth is available for sending the second scrub file, the second scrub file being started to send after completing sending the first scrub file; and performing bit rate adaptation if bandwidth is not available for sending the second scrub file.

9. The method of claim 8, wherein sending of the first scrub file is started after completing sending an index file.

10. The method of claim 1, wherein delivering preview information to be displayed at the client through the network comprises:

determining whether bandwidth is available for sending a first scrub file comprising a $k^1$ layer of a scrub description without causing playback jitter while rendering the media file to be streamed;

sending the first scrub file if bandwidth is available for sending the first scrub file;

performing bit rate adaptation if bandwidth is not available for sending the first scrub file;

determining whether bandwidth is available for sending a second scrub file comprising a $k^q$ layer of the scrub description without causing playback jitter while rendering the media file to be streamed, wherein the $k^1$ layer and the $k^q$ layer are layers from the plurality of layers of the multi-dimensional hierarchical data structure, and wherein the $k^1$ layer and the $k^q$ layer are selected based on a decision criterion;

sending the second scrub file if bandwidth is available for sending the second scrub file, the second scrub file being started to send after completing sending the first scrub file; and performing bit rate adaptation if bandwidth is not available for sending the second scrub file.

11. The method of claim 10, wherein the decision criterion comprises selecting a level of granularity from the plurality of layers.

12. The method of claim 11, wherein the decision criterion is selected a $$k^q = K \frac{g^q}{Gn},$$

and where a granularity selection parameter $g^q$, $q \in [1,Q]$, defines the level of granularity, and Gn defines a total number of levels of granularities.

13. The method of claim 12, wherein the granularity selection parameter $g^q$ is specified by a media player.

14. The method of claim 12, wherein the granularity selection parameter $g^q$ is specified by a user preference function and/or a bandwidth adaptation function.

15. The method of claim 10, wherein sending of the first scrub file is started after completing sending an index file.

16. The method of claim 1, wherein the preview data comprises scrub description information and keyframe images.

17. The method of claim 16, wherein delivering the preview information to be displayed at the client through the network comprises, at each layer, sending the scrub description information and then sending the keyframe images.

18. The method of claim 16, wherein, at each layer, the scrub description information and keyframe images are combined into a single dual view preview data file, and wherein delivering the preview data comprises sending the single dual view preview data file.

19. The method of claim 1, wherein the preview data comprises scrub preview configured to be displayed when a play-head is moved forward or backward along a preview bar.

20. An apparatus for streaming a media preview of a media over a network, the apparatus comprising:
a preview data sender configured to receive a request to deliver a preview data to a client through the network, the preview data comprising preview information for a media file being streamed, wherein the preview data comprises a multi-dimensional hierarchical data structure having a plurality of layers with increasing content of the preview information in each layer of the plurality of layers, wherein the preview data sender is configured to provide an adaptive and scalable preview service, wherein the preview data comprises scrub description information, wherein the preview data comprises a plurality of preview locations on a timeline of the media file being streamed, and wherein each preview location is associated with a corresponding time frame on the timeline of the media file being streamed; and
wherein the preview data sender is further configured to deliver the layer of the preview data comprising preview information to be displayed at the client through the network, wherein the preview data sender comprises:
a preview data request receiver configured to receive a request for the preview data;
a manifest file bandwidth determinator configured to determine whether bandwidth is available for sending a manifest file without causing playback jitter while rendering the media file to be streamed;
a manifest file bit rate adaptor configured to perform bit rate adaptation in response to the manifest file bandwidth determinator determining that bandwidth is not available for sending the manifest file; and
a manifest file sender configured to
send the manifest file in response to the manifest file bandwidth determinator determining that bandwidth is available for sending the manifest file,
send the manifest file after performing bit rate adaptation in response to the manifest file bandwidth determinator determining that bandwidth is not available for sending the manifest file.

21. The apparatus of claim 20, wherein the adaptive and scalable preview service provides a differentiated preview service.

22. The apparatus of claim 20, wherein the preview data comprises preview data type information.

23. The apparatus of claim 22, wherein the preview data sender comprises:
a service request receiver configured to receive a service request from a client;
an instantaneous user service profile generator configured to generate an instantaneous user service profile identifying a layer of preview data for each type of preview data;
a layer identifier configured to identify the layer of the preview data in the instantaneous user service profile to be transmitted;
a preview information extractor configured to extract a specific preview information in the layer of the preview data; and
a preview information sender configured to send the specific preview information to the client.

24. The apparatus of claim 22, wherein the preview data sender comprises:
a user parameter receiver configured to receive a user parameter from a client;
a preview description data estimator configured to define a preview description data and/or network transmission parameters based on the user parameter; and
a preview description data sender configured to send the preview description data to the client using the defined preview description data and/or network transmission parameters.

25. The apparatus of claim 20, wherein the preview data sender comprises:
a manifest file sender configured to send a manifest file comprising additional description and/or metadata;
an index file sender configured to send an index file after sending the manifest file; and
a scrub description file sender configured to send a scrub description file comprising the scrub description information, wherein the manifest file, the index file, and the scrub description file are configured to be sent without causing playback jitter while rendering the media file to be streamed, and wherein the index file describes the structure of the scrub description file.

26. The apparatus of claim 20, wherein the preview data sender further comprises:
an index file bandwidth determinator configured to determine whether bandwidth is available for sending an index file without causing playback jitter while rendering the media file to be streamed;
an index file sender configured to send the index file if bandwidth is available for sending the index file, the index file sender configured to start sending the index file after completing sending the manifest file by the manifest file sender; and
an index file bit rate adaptor configured to perform bit rate adaptation if bandwidth is not available for sending the index file.

27. The apparatus of claim 20, wherein the preview data sender comprises:
a first scrub file determinator configured to determine whether bandwidth is available for sending a first scrub file comprising a first layer of a scrub description without causing playback jitter while rendering the media file to be streamed;
a first scrub file sender configured to send the first scrub file if bandwidth is available for sending the first scrub file;
a first scrub file bit rate adaptor configured to perform bit rate adaptation if bandwidth is not available for sending the first scrub file;
a second scrub file determinator configured to determine whether bandwidth is available for sending a second scrub file comprising a $k^{th}$ layer of the scrub description without causing playback jitter while rendering the media file to be streamed, wherein the $k^{th}$ layer is any layer from the plurality of layers of the multi-dimensional hierarchical data structure;
a second scrub file sender configured to send the second scrub file if bandwidth is available for sending the second scrub file, the second scrub file sender configured to start sending the second scrub file after the first scrub file sender completes sending the first scrub file; and
a second scrub file bit rate adaptor configured to perform bit rate adaptation if bandwidth is not available for sending the second scrub file.

28. The apparatus of claim 27, wherein the first scrub file sender starts sending the first scrub file after an index file sender completes sending an index file.

29. The apparatus of claim 20, wherein the preview data sender comprises:
a first scrub file determinator configured to determine whether bandwidth is available for sending a first scrub file comprising a $k^1$ layer of a scrub description without causing playback jitter while rendering the media file to be streamed;
a first scrub file sender configured to send the first scrub file if bandwidth is available for sending the first scrub file;
a first scrub file bit rate adaptor configured to perform bit rate adaptation if bandwidth is not available for sending the first scrub file;
a second scrub file determinator configured to determine whether bandwidth is available for sending a second scrub file comprising a $k^q$ layer of the scrub description without causing playback jitter while rendering the media file to be streamed, wherein the $k^1$ layer and the $k^q$ layer are layers from the plurality of layers of the multi-dimensional hierarchical data structure, and wherein the $k^1$ layer and the $k^q$ layer are selected based on a decision criterion;
a second scrub file sender configured to send the second scrub file if bandwidth is available for sending the second scrub file, the second scrub file sender configured to start sending the second scrub file after the first scrub file sender finishes sending the first scrub file; and
a second scrub file bit rate adaptor configured to perform bit rate adaptation if bandwidth is not available for sending the second scrub file.

30. The apparatus of claim 29, wherein the decision criterion comprises a level of granularity from the plurality of layers.

31. The apparatus of claim 30, wherein the decision criterion is given by a formula $$k^q = K \frac{g^q}{Gn},$$

and where a granularity selection parameter $g^q$, $q \in [1,Q]$, defines the level of granularity, and Gn defines a total number of levels of granularities.

32. The apparatus of claim 31, wherein the granularity selection parameter $g^q$ is specified by a media player.

33. The apparatus of claim 31, wherein the granularity selection parameter $g^q$ is specified by a user preference function and/or a bandwidth adaptation function.

34. The apparatus of claim 29, wherein the first scrub file sender starts sending the first scrub file after an index file sender completes sending an index file.

35. The apparatus of claim 20, wherein the preview data comprises scrub description information and keyframe images.

36. The apparatus of claim 35, wherein the preview data sender comprises, at each layer, a scrub description information sender configured to send the scrub description information and then send the keyframe images.

37. The apparatus of claim 35, further comprising a combinator configured to combine the scrub description information and keyframe images into a single dual view preview data file at each layer, and wherein the preview data sender is configured to send the single dual view preview data file.

38. The apparatus of claim 20, wherein the preview data comprises scrub preview configured to be displayed when a play-head is moved forward or backward along a preview bar.

* * * * *